United States Patent [19]

Okahara

[11] Patent Number: 5,697,866
[45] Date of Patent: Dec. 16, 1997

[54] ENGINE-CVT DRIVETRAIN CONTROL SYSTEM

[75] Inventor: Hirofumi Okahara, Isehara, Japan

[73] Assignee: Nissan Motor Co., Ltd., Yokohama, Japan

[21] Appl. No.: 450,642

[22] Filed: May 25, 1995

[30] Foreign Application Priority Data

May 25, 1994 [JP] Japan .................. 6-111538

[51] Int. Cl.$^6$ .................................................. B60K 41/02
[52] U.S. Cl. ........................ 477/169; 477/64; 477/174; 477/176
[58] Field of Search ........................ 477/62, 64, 70, 477/168, 169, 174, 175, 176

[56] References Cited

U.S. PATENT DOCUMENTS

| 4,583,627 | 4/1986 | Kumura et al. ............... 477/176 |
| 4,735,113 | 4/1988 | Yamamuro et al. .............. 74/866 |
| 4,881,627 | 11/1989 | Ishii ........................ 477/168 |
| 5,035,308 | 7/1991 | Baba et al. ................... 477/62 |
| 5,067,372 | 11/1991 | Suzuki ........................ 74/866 |
| 5,085,301 | 2/1992 | Imamura et al. .............. 477/169 |
| 5,086,894 | 2/1992 | Iizuka et al. ............. 477/176 X |
| 5,143,191 | 9/1992 | Nobumoto et al. .......... 477/176 X |
| 5,213,186 | 5/1993 | Murata ....................... 477/169 |
| 5,219,055 | 6/1993 | Imamura ................... 477/62 X |
| 5,226,513 | 7/1993 | Shibayama ................... 477/169 |
| 5,435,795 | 7/1995 | Mochizuki et al. ............. 477/39 |

FOREIGN PATENT DOCUMENTS 4025 455 C2  8/1995  Germany .

*Primary Examiner*—Charles A. Marmor
*Assistant Examiner*—Peter T. Kwon
*Attorney, Agent, or Firm*—Foley & Lardner

[57] ABSTRACT

A control system for an engine-CVT drivetrain controls torque transmitting capacity of a lock-up clutch in response to drop of operator's power demand to keep hydraulic drive of a fluid coupling operable until a predetermined period of time passes after the subsequent increase of operator's power demand.

14 Claims, 17 Drawing Sheets

ENGINE-CVT DRIVETRAIN CONTROL SYSTEM

BACKGROUND OF THE INVENTION

The present invention relates to an automotive vehicle including an engine, a hydokinetic torque transmitting unit with a lock-up clutch, and a continuously variable transmission (CVT), and more particularly to a control system for an engine-CVT drivetrain.

U.S. Pat. No. 4,735,113 discloses a control system for an engine-CVT drivetrain. This known control system engages a lock-up clutch of a hydrokinetic torque transmitting unit when vehicle speed exceeds a predetermined lock-up on vehicle speed and releases the engagement of the lock-up clutch when subsequently vehicle speed drops below a predetermined lock-up off vehicle speed that is set lower than the lock-up on vehicle speed. This control system changes a CVT ratio continuously with varying throttle opening degree of a throttle of the engine. When an operator releases a gas pedal linked to the engine throttle, throttle opening degree decreases and CVT ratio decreases. Subsequently when the operator depresses the gas pedal again, throttle opening degree increases and CVT ratio increases again, causing a rapid increase in engine torque. Since the lock-up clutch is engaged at vehicle speeds above 10 km, this change in engine torque is transmitted by the lock-up clutch to the CVT output shaft, producing shocks.

An object of the present invention is to improve a control system of the above kind such that the above-mentioned shocks at acceleration upon depression of the gas pedal subsequent to release of the gas pedal is reduced below a satisfactorily low level.

SUMMARY OF THE INVENTION

The present invention uses lock-up control as a means for controlling torque transmitting capacity of a frictional torque transmitting means in response to drop of operator's power demand to keep hydraulic drive of a hydrokinetic torque transmitting unit operable until a predetermined period of time passes after the subsequent increase of operator's power demand.

The present invention uses a control system, for a vehicle drivetrain including an engine, a CVT having an input shaft and an output shaft, a hydrokinetic torque transmitting unit for establishing hydraulic drive to transmit torque between the engine and input shaft of the CVT, and frictional torque transmitting means engageable to establish mechanical drive to transmit torque between the engine and input shaft of the CVT. The control system includes lock-up control means operable in response to a lock-up command signal to establish engagement of the frictional torque transmitting means, and controller means developing the lock-up command signal in response to a signal indicative of speed of the output shaft of the CVT for engaging the frictional torque transmitting means. The improved controlled means controls the lock-up command signal ($DUTY_{128}$) to control torque transmitting capacity of the frictional torque transmitting means in response to drop of operator's power demand to keep the hydraulic drive of the hydrokinetic torque transmitting unit operable until a predetermined period of time passes after the subsequent increase of operator's power demand.

BRIEF DESCRIPTION OF THE DRAWINGS

FIGS. 2A and 2B, when combined, are a hydraulic circuit of a hydraulic control system;

DETAILED DESCRIPTION OF THE INVENTION

Figure 1:
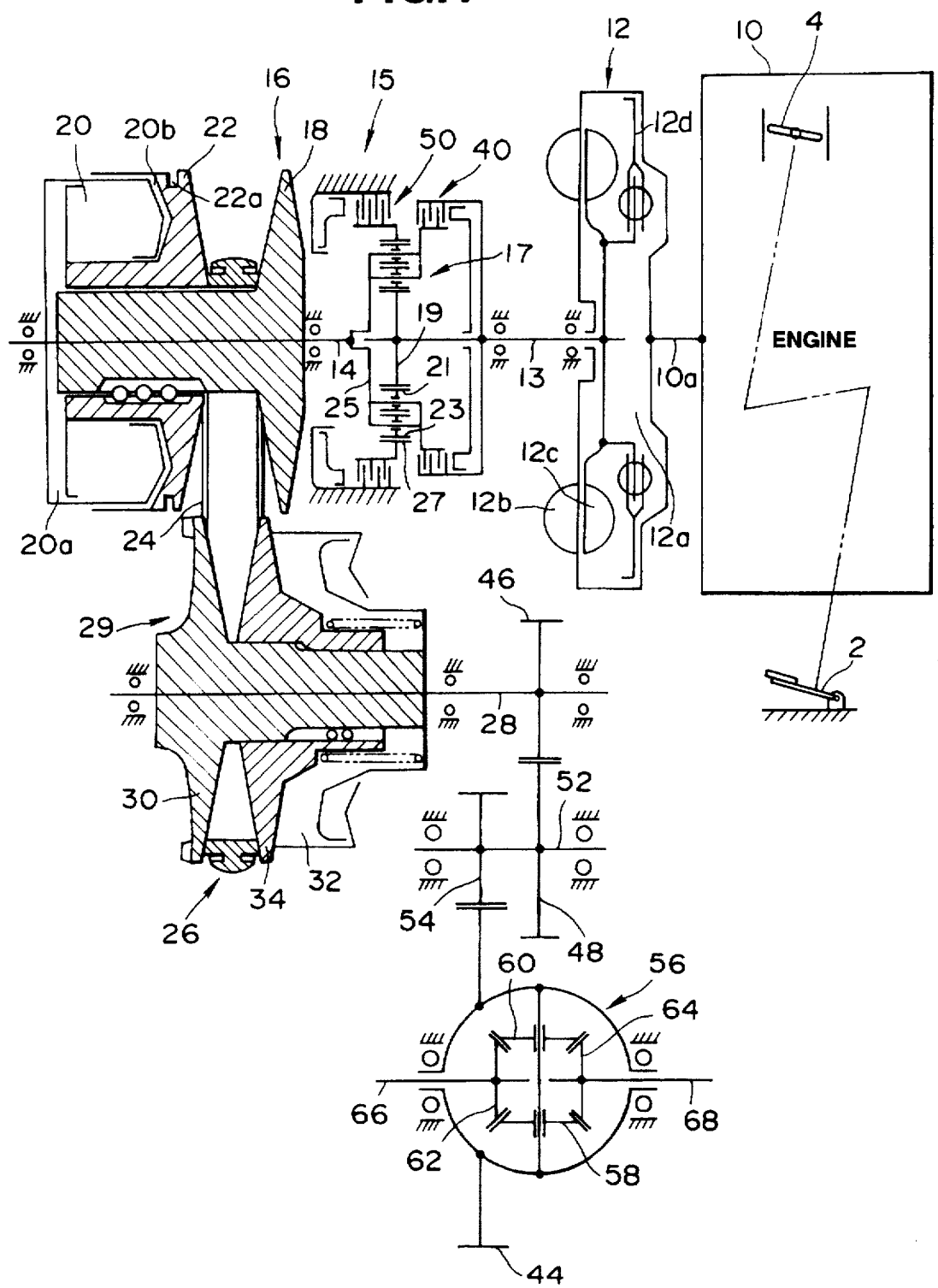
FIG. 1 is schematic view of a continuously variable transmission (CVT) incorporated in a transaxle drivingly connected to an engine.

Referring to FIG. 1, a block 10 represents an engine. The engine 10 has a throttle 4 which opens in degrees in response to depressed position of a gas pedal 2. The engine 10 is drivingly connected to a hydrokinetic torque transmitting unit in the form of a fluid coupling 12 or a torque converter if desired. The fluid coupling 12 is drivingly connected to a continuously variable transmission (CVT) 29 through a forward/reverse change-over mechanism 15 including a planetary gearing 17, a forward clutch 40 and a reverse brake 50. This drive connection can be interrupted when a forward clutch 40 is disengaged with a reverse brake 50 released. The fluid coupling 12 includes a frictional torque transmitting clutch often called as a lock-up clutch 12d.

For forward drive, the forward clutch 40 is engaged with the reverse brake 50 released, while for reverse drive, the reverse brake 50 is applied with the forward clutch 40 disengaged. The CVT 29 is drivingly connected to a final drive 56. The CVT 29 includes a driver pulley 16, a follower pulley 26 and a V-belt 24. It will be understood that the present invention is not limited to the use of CVT's with pulley V-belt power transfer. The present invention is operational with any other type of CVT in which the ratio can be controlled, including traction drive type CVT's.

The fluid coupling 12 contains oil between a pump impeller 12b and a turbine runner 12c to establish hydraulic drive therebetween to transmit torque between an output shaft 10a of the engine 10 and an input shaft 14 of the CVT 29. The lock-up clutch 12d is completely engaged when a lock-up chamber 12a is drained. The lock-up clutch 12d may slip by controlling pressure within the lock-up chamber 12a. Thus, the lock-up clutch 12d is engageable to establish mechanical drive between the pump impeller 12b and turbine runner 12c to transmit torque between the engine 10 and the CVT 29. Torque transmitting capacity of the lock-up clutch 12d may be varied by controlling pressure within the lock-up chamber 12a. If torque transmitting capacity of the lock-up clutch 12d decreases to cause an increase in slip, a portion of engine torque transmitted by the hydraulic drive of the fluid coupling 12 increases.

Detailed description of FIG. 1 is found in U.S. Pat. No. 5,067,372 issued on Nov. 26, 1991 to Suzuki and commonly assigned herewith. This U.S. Patent corresponds to DE-A 40 25 455. For further understanding of FIG. 1, reference should be made to description of FIG. 1 of this U.S. Pat. No. 5,067,372 which is hereby incorporated by reference.

Figure 2:
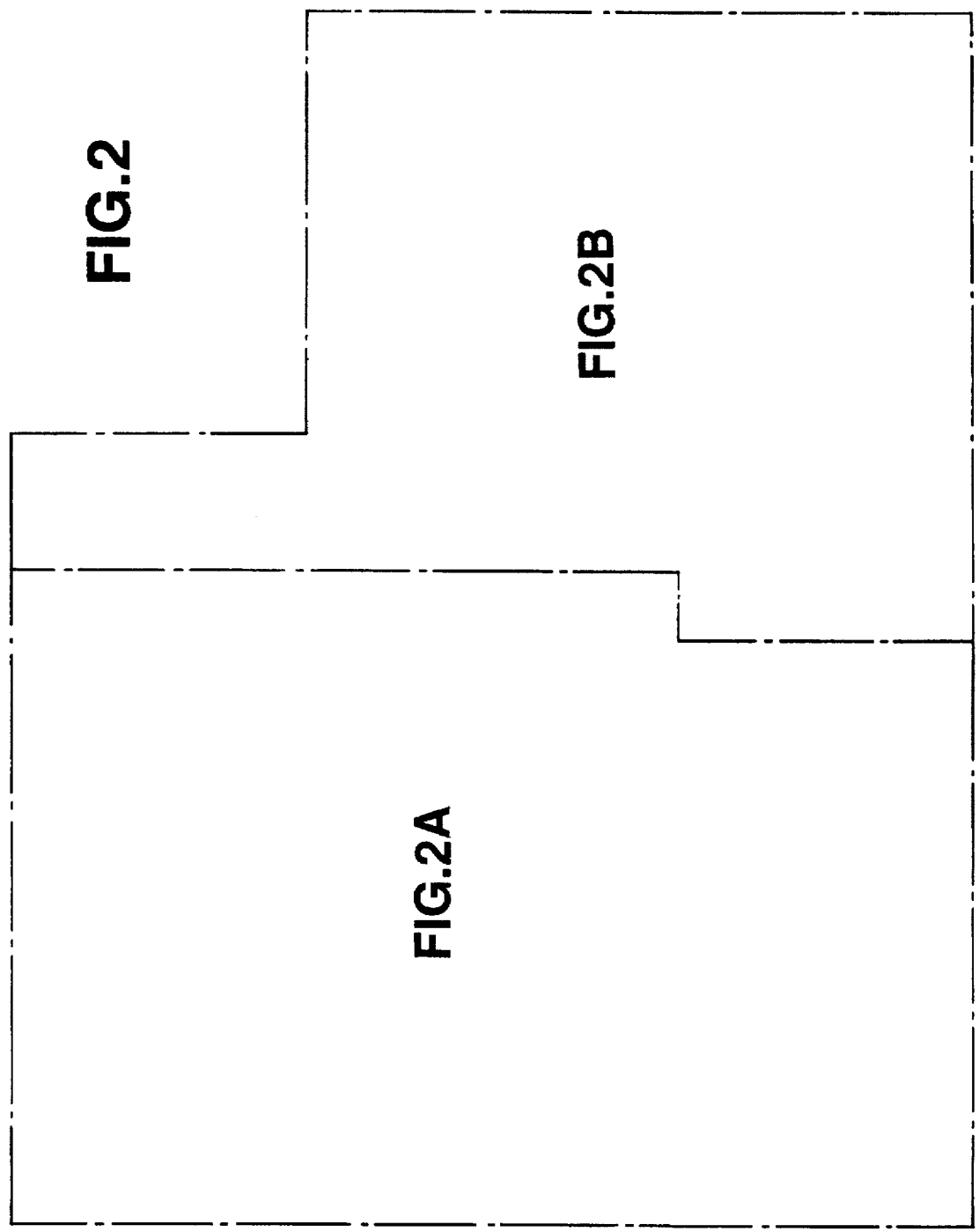
FIG. 2 illustrates how
Figure 2A:
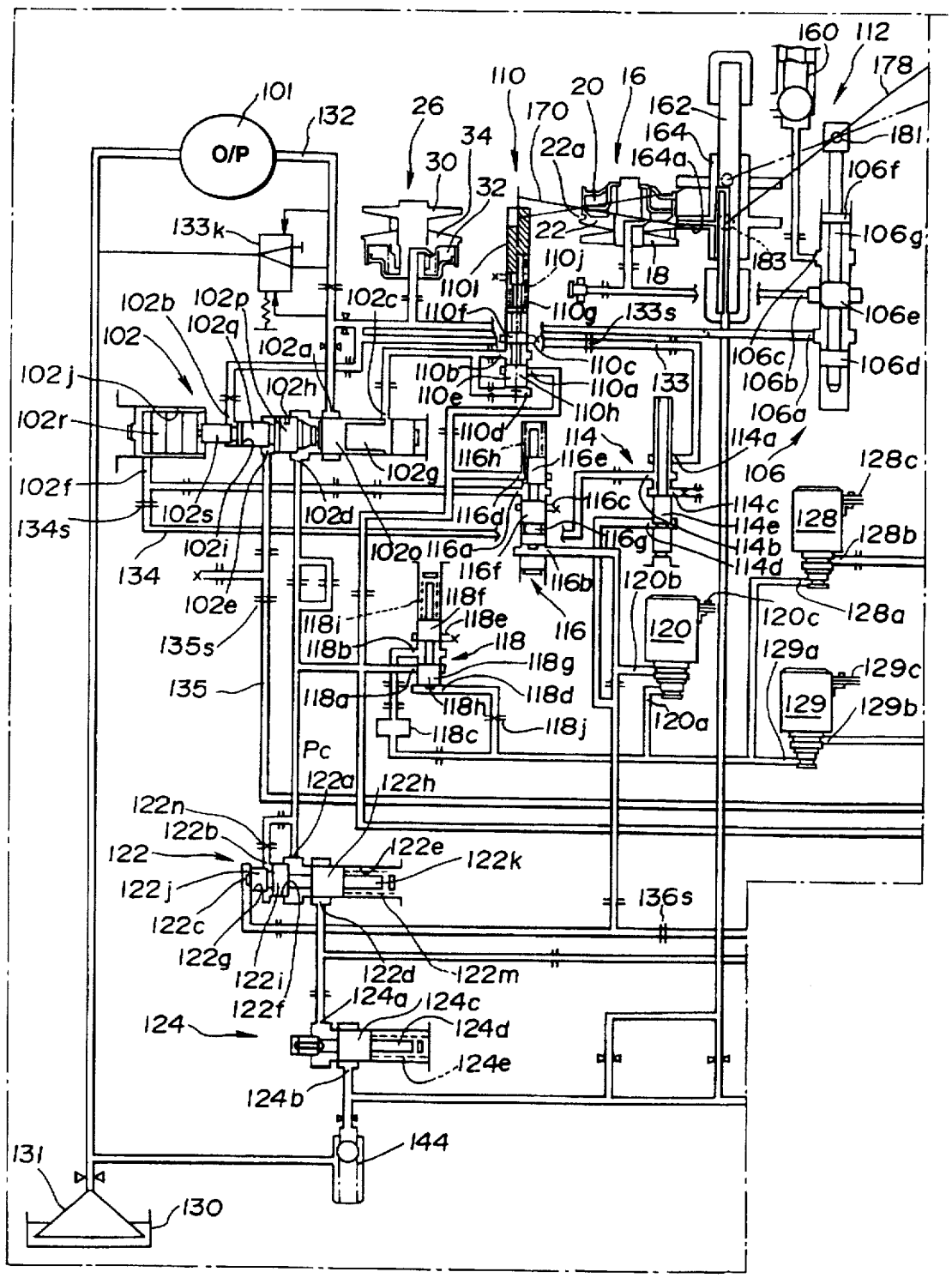
FIG. 2A and FIG. 2B are combined.
Figure 2B:
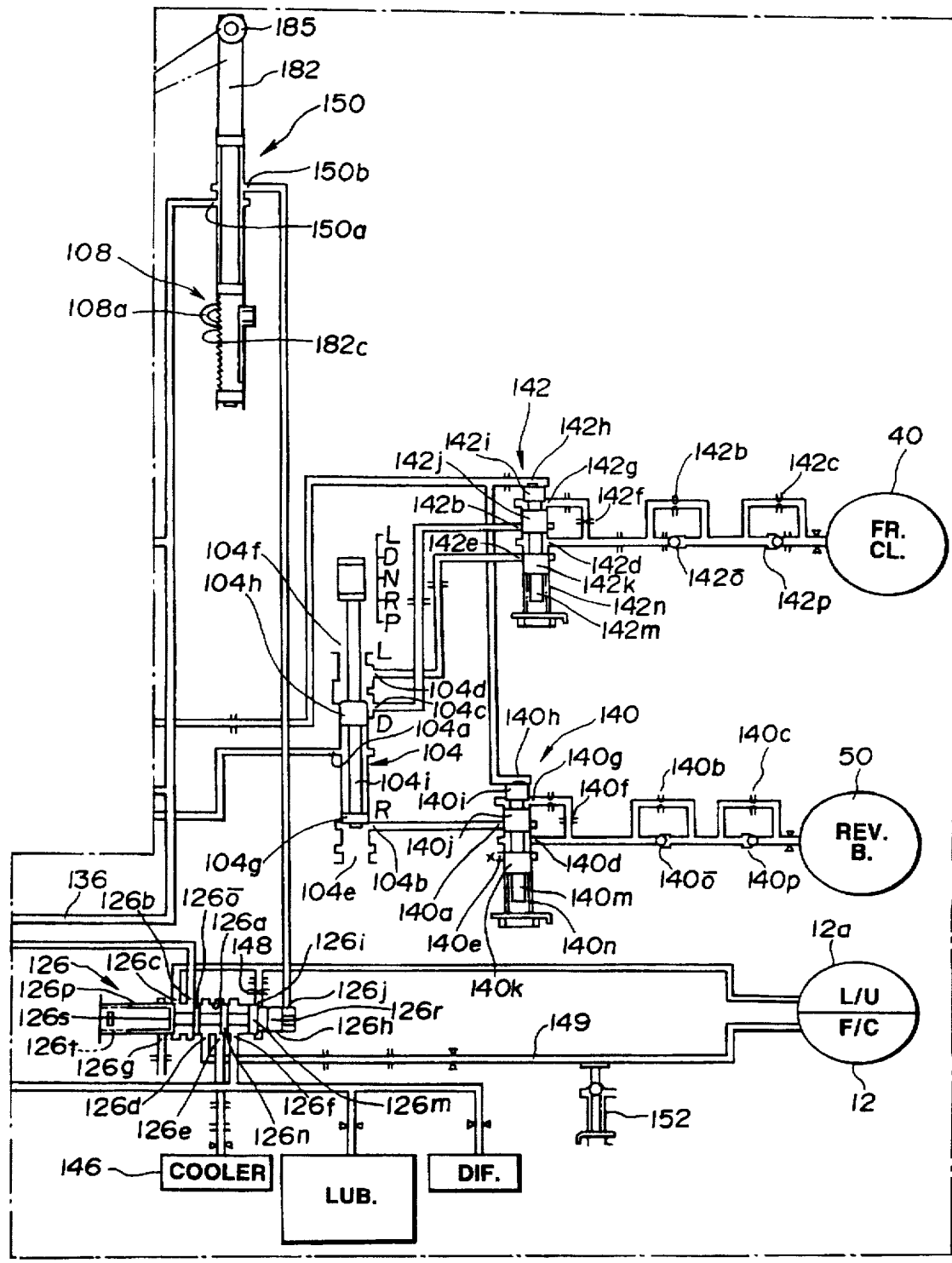

Referring to FIGS. 2A and 2B, a hydraulic control system for the transaxle including the CVT 29 is described.

An oil pump 101 has a suction side to draw in oil from a tank 130 via a strainer 131, and a discharge side connected to one end of a passage 132. The other end of the passage 132 is connected to a port 102a of a line pressure regulator valve 102. This passage 132 has a branch connected to a cylinder chamber 32 of the follower pulley 26 of the CVT 29, a branch connected to a feedback port 102b of the line pressure regulator valve 102, and a branch connected to a port 106a of a shift control valve 106. The passage 132 also has a branch 133 connected to a port 114a of a transfer valve 114. In this embodiment, the branch 133 is blocked by a separator 133s.

In the line pressure regulator valve 102, pressure regulation is effected to generate a line pressure. The line pressure builds up not only at the port 102a, but also at the feedback port 102b. During the pressure regulation, oil under pressure is delivered from a port 102d to ports 122a and 122b of a clutch relief valve 122, an inlet port 118a of a pilot valve 118, a port 104a of a manual selector valve 104, a port 110a of a CVT ratio pressure transducer valve 110, and an inlet port 116d of a pressure modifier valve 116. A line pressure relief valve 133k is schematically shown and connected to the passage 132 to suppress an excessive increase of line pressure.

In addition to the inlet port 118a connected to the port 102d of the line pressure regulator valve 102, the pilot valve 118 has an outlet port 118b, a feedback port 118d and a drain port 118e. Fluidly disposed between the outlet port 118b and feedback port 118d is a filter 118c. Fluidly disposed between the filter 118c and the feedback port 118d is an orifice 118j. The pilot valve 118 has a spool 118h with two lands 118f and 118g and a spring 118i biasing the spool 118h toward the feedback port 118d. The spool 118h is subjected to pressure at the feedback port 118d. If this pressure is zero, the port 118a is uncovered by the land 118g, while the drain port 118e is covered by the land 118f, causing an increase in pressure at the outlet port 118b. This increase in pressure is transmitted to the feedback port 118d, moving the spool 118h against the spring 118i. During this movement of the spool 118h, the land 118g covers the inlet port 118a, while the land 118f uncovers the drain port 118e, causing a drop in pressure at the outlet port 118b. This drop in pressure allows the spring 118i to move the spool 118h toward the feedback port 118d. During this movement of the spool 118h, the land 118f covers the drain port 118e, while the land 118g uncovers the inlet port 118a, causing an increase in pressure at the outlet port 118b again. As a result, the spool 118h assumes an equilibrium position to produce a constant pressure determined by the bias force of the spring 118i.

This constant pressure, which may be called as a pilot pressure, is supplied to an inlet port 120a of a pressure modifier duty solenoid valve 120, an inlet port 128a of a lock-up duty solenoid valve 128, and an inlet port 129a of a clutch duty solenoid valve 129. The pressure modifier duty solenoid valve 120 is responsible for line pressure control. The lock-up duty solenoid valve 128 is responsible for lock-up control. The clutch duty solenoid valve 129 is responsible for creep control.

In addition to the inlet port 120a, the pressure modifier duty solenoid valve 120 has a drain port 120c and an outlet port 120b connected to a port 116b of the pressure modifier valve 116. When duty ($DUTY_{120}$) of the solenoid valve 120 is 0%, a needle closes the drain port 120c, allowing the full supply of the pilot pressure from the inlet port 120a to the outlet port 120b. When the duty $DUTY_{120}$ is 100%, the needle opens the drain port 120c, draining oil from the outlet port 120b. The duty $DUTY_{120}$ can be adjusted to any value falling in a range from 0% to 100%. Pressure appearing at the outlet port 120b, which may be called as a modifier valve control pressure, varies continuously between the highest level as high as the pilot pressure and the lowest level as $DUTY_{120}$ varies continuously between 0% and 100%. In other words, the modifier valve control pressure is inversely proportional to $DUTY_{120}$.

In addition to the port 116b receiving the modifier valve control pressure from the solenoid valve 120, the pressure modifier valve 116 has a drain port 116c and an outlet port 116a connected to a port 102f of the line pressure regulator valve 102. The pressure modifier valve 116 has a spool 116g with two lands 116e and 116f and a spring 116h biasing the spool 116g. The land 116e is formed with an axial through orifice that provides constant fluid communication between a chamber accommodating therein the spring 116h and an annular chamber defined between the lands 116e and 116f. The outlet port 116a is always open to this annular chamber so that the pressure at the port 116a is transmitted through the axial orifice to the spring accommodating chamber to act on the land 116e in a direction assisting the action of the spring 116h. When the modifier valve control pressure supplied from the solenoid valve 120 to the port 116b is zero, the spool 116g assumes a spring set position where the land 116e covers the port 116d and the land 116f uncovers the drain port 116c. Under this condition, the outlet port 116a is drained. An increase in modifier valve control pressure moves the spool 116g against the spring 116h. During this movement of the spool 116g, the land 116e uncovers the inlet port 116d after the land 116f has covered the drain port 116c. Immediately after the inlet port 116d is uncovered to communicate with the outlet port 116a, there is a pressure increase at the outlet port 116a and also in the spring accommodating chamber. This pressure increase at the outlet port 116a moves the spool 116g in the direction assisting the action of the spring 116h, causing the land 116e to cover the inlet port 116d and the land 116f to uncover the drain port 116c, resulting in a decrease in pressure at the outlet port 116a. As a result, the spool 118h assumes an equilibrium position to produce, at the outlet port 116a, a pressure, which may be called as a modifier pressure, variable with the modifier valve control pressure that is variable with the duty $DUTY_{120}$ of the solenoid valve 120.

Figure 7:
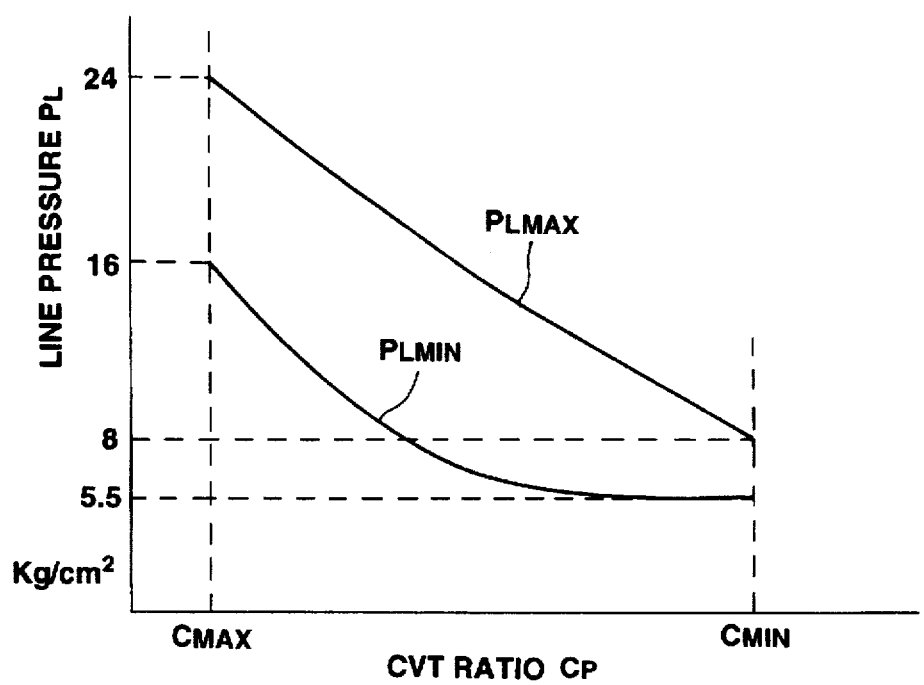
FIG. 7 shows a curve $P_{LMAX}$ interconnecting plots of the maximum value of line pressure $P_L$ at each CVT ratio $C_P$ with the highest value of engine torque $T_E$, and another curve $P_{LMIN}$ interconnecting plots of the minimum value of line pressure $P_L$ at each CVT ratio with the lowest value of engine torque $T_E$.

The modifier pressure is supplied to the port 102f of the line pressure regulator valve 102. In addition to this port 102f and the before mentioned ports 102a, 102b and 102d, the line pressure regulator valve 102 has a port 102e, which is drained, and a port 102c. The line pressure regulator valve 102 has a spool 102s with lands 102o, 102p, 102q and 102r. The land 102r has the largest diameter and is slidably disposed in a bore section 102j having the largest diameter. Among the other three lands, the land 102o has the largest diameter, land 102h has a diameter smaller than that of the land 102o, and land 102s has the smallest diameter. These three lands 102o, 102p and 102q are slidably disposed in the bore sections 102g, 102h and 102i, respectively. The ports 102a and 102c are open to the bore section 102g, the ports 102d and 102e are open to the bore section 102h and port 102f is open to the bore section 102j. The spool 102s is biased by spring means, not illustrated, in a leftward direction, viewing from FIG. 2A. In this embodiment, the port 102e is used as a drain port. If desired, this port 102e may be connected via a branch 135 to the lock-up duty solenoid valve 128. The branch 135 is blocked, in this embodiment, by a separator 135s. The setting of the line pressure regulator valve 102 is such that, with the same pressure supplied to the port 102c, as the modifier pressure at the port 102f decreases, the line pressure $P_L$ increases from a minimum value $P_{LMIN}$ (see FIG. 7) toward a maximum value $P_{LMAX}$. Thus, the line pressure $P_L$ can be adjusted to any value between the minimum and maximum values $P_{LMIN}$ and $P_{LMAX}$ inclusive by varying the duty $DUTY_{120}$ of the solenoid valve 120. In this embodiment, the pressure supplied to the port $102_c$ varies with varying CVT ratio $C_P$. As shown in FIG. 7, as the CVT ratio $C_P$ varies in a downshift direction from the minimum or smallest ratio $C_{MIN}$ toward the maximum or largest ratio $C_{MAX}$, the maximum value $P_{LMAX}$ of line pressure $P_L$ increases at substantially the same rate, while the minimum value $P_{LMIN}$ increases at a progressively increasing rate.

The modifier valve control pressure produced by the pressure modifier duty solenoid valve 120 is also supplied to a port 114d of the transfer valve 114 and a port 122c of the clutch relief valve 122. As mentioned before, the port 114a of the transfer valve 114 is connected to the branch 133 blocked by the separator 133s. The transfer valve 114 has a port 114b and a drain port in addition to the ports 114a and 114d. The port 114b is connected through a passage 134 to the port 102f of the line pressure regulator valve 102. But, this passage 134 is blocked by a separator 134s. Thus, the transfer valve 114 does not play any role in this control system owing to the separators 133s and 134s. The transfer valve 114 has a spool 114e moved by the modifier valve control pressure supplied to the port 114d to cover the drain port 114c, enabling supply of pressure from the port 114a to the port 114b.

Figure 10:
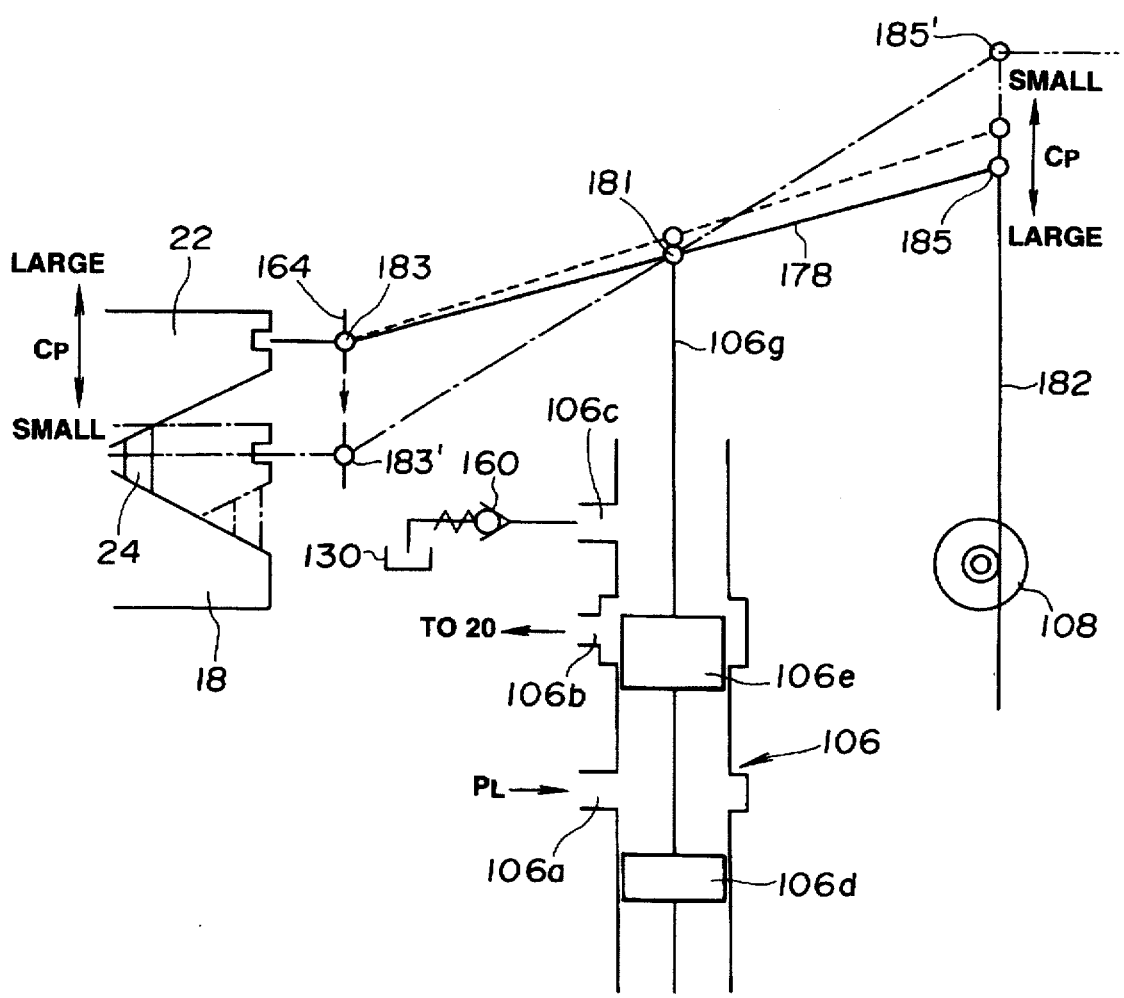
FIG. 10 is a diagram illustrating the relationship between a stepping motor, a ratio control element, a ratio control valve and a driver pulley.

The pressure supplied to the port 102c of the line pressure regulator valve 102 is generated by the CVT ratio pressure transducer valve 110. This pressure may be called as a CVT ratio dependent pressure since a sensor shoe 164 movable with a positionable pulley half 22 of the driver pulley 16 is connected through a lever 170 to a movable spring retainer 110i to change bias force of a spring 110j in response to a position of the pulley half 22. The sensor shoe 164 is non-rotatably but slidably supported by a guide 162 and has a radially extending flange 164a engaged in groove 22a of the pulley half 22 (see FIGS. 1 and 10) to follow movement of the pulley half 22. The lever 170 is connected to the sensor shoe 164 at one end and to the spring retainer 110i at the opposite end. At a point between the two ends, the lever 170 is pivoted. In addition to the port 110a, the CVT ratio pressure transducer valve 110 has a port 110b connected to the port 102c of the line pressure regulator valve 102, a feedback port 110d connected to the port 110b, and a drain port 110c. The transducer valve 110 has a spool 110h having three lands 110e, 110f and 110g. The spring 110j is disposed between the spring retainer 110i and the spool 110h. As the positional pulley half 22 moves away from the pulley half 18 to increase the CVT ratio, the sensor shoe 160 moves the one end of the lever 170 and the opposite end of the lever 170 moves the spring retainer 110i toward the spool 110h to compress the spring 110j. The bias force of the spring 110j increases, causing the CVT ratio dependent pressure at the port 110b to increase accordingly.

In addition to the inlet port 106a receiving the line pressure, the shift control valve 106 has an outlet port 106b connected to a cylinder chamber 22 of the driver pulley 16, and a low pressure port 106c connected via a pressure maintaining or relief valve 160 to the tank 130. The shift control valve 106 has a spool 106g having three lands 106d, 106e and 106f. Viewing from in FIG. 2A, upward movement of the spool 106g from the illustrated position causes the land 106 to increase fluid communication between the outlet port 106b and the inlet port 106a and decrease fluid communication between the outlet port and the low pressure port 106c, resulting in an increase in pressure within the cylinder chamber 22 of the driver pulley 16, moving the pulley halves 22 and 18 toward each other. Downward movement of the spool 106g from the illustrated position causes the land 106 to decrease fluid communication between the outlet port 106b and the inlet port 106a and to increase fluid communication between the outlet port 106b and the low pressure port 106c, resulting in a decrease in pressure within the cylinder chamber 22 of the driver pulley 16, allowing the V-belt 24 to move the pulley halves 22 and 18 apart.

A ratio control element is in the form of a rod or spool 182 of a shift command valve 150. The rod 182 is drivingly engaged via a rack 182c and a pinion 108a with an actuator in the form of a stepping motor 108.

In response to a ratio change command, the stepping motor 108 turns to move a lever 178, connected to the rod 182 at a pin 185, to control the ratio of the CVT 29. The lever 178 is connected to the rod 182 at one end and to the sensor shoe 164 via a pin 183 at the other end. At a point between the two ends, the lever 178 is pivotably connected via a pin 181 to the spool 106g of the shift control valve 106. This arrangement, which may be called as a shift operation mechanism 112, provides position feedback of the pulley 16 to the shift control valve 106. As the stepping motor 108 moves the lever 178, the shift control valve 106, in response to the movement of the valve spool 106g, alters the pressure supplied to the driver pulley 16 although the pressure supplied to the follower pulley 26 is unaltered. As the pressure supplied to the driver pulley 16 is altered, the pulley halves 18 and 22 move, changing the ratio of the CVT 29. As the sensor shoe 164 moves with the pulley half 22, the lever 178 moves repositioning the valve spool 106g, providing a means for the shift control valve 106 to stop the positional pulley half 22 from moving.

In addition to the inlet port 122a, feedback port 122b and port 122c receiving the modifier valve control pressure, the clutch relief valve 122 has an outlet port 122d. The feedback port 122b is connected via an orifice 122n to the inlet port 122a. The outlet port 122d is connected to an inlet port 124a of a torque converter relief valve 124. The clutch relief valve 122 has three bore sections, namely the largest diameter bore section 122e formed with the inlet and outlet ports 122a and 122d, the smallest diameter bore section 122g formed with the port 122c and an intermediate diameter bore section 122f formed with the feedback port 122b. The intermediate bore section 122f is disposed between and interconnects the largest and smallest diameter bore sections 122e and 122g. The clutch relief valve 122 also has a spool 122k having three lands 122h, 122i and 122j slidably received in the bore sections 122e, 122f and 122g, respectively, and a spring 122m biasing the spool 122k. If desired, the port 122c may be connected via a branch 136 to the lock-up duty solenoid valve 128. In this embodiment, however, the branch 136 is blocked by a separator 136s.

In addition to the inlet port 124a, the torque converter relief valve 124 has an outlet port 124b, a spool 124d with a single land 124c and a spring 124 biasing the spool 124d to move in a direction to cover the outlet port 124b. The outlet port 124b is connected via a lubricant relief ball valve 144 to the suction side of the pump 101. Oil discharged from the outlet port 12b is supplied, as lubricant, to a system such as a power train and V-belt, and differential.

In addition to the inlet port 128a, the lock-up duty solenoid valve 128 has a drain port 128c and an outlet port 128b connected to a port 150a of the shift command valve 150. When duty ($DUTY_{128}$) of the solenoid valve 128 is 100%, a needle closes the drain port 128c, allowing the full supply of the pilot pressure from the inlet port 128a to the outlet port 128b. When the duty $DUTY_{128}$ is 0%, the needle opens the drain port 128c, draining oil from the outlet port 128b. The duty $DUTY_{128}$ can be adjusted to any value falling in a range from 0% to 100%. Pressure appearing at the outlet port 128b, which may be called as a lock-up control pressure $P_{LU}$, varies continuously between the lowest level and the highest level as high as the pilot pressure as $DUTY_{128}$ varies continuously between 0% and 100%. In other words, the lock-up control pressure $P_{LU}$ is proportional to $DUTY_{128}$.

The lock-up control valve 126 has a bore 126a and a reduced diameter bore 126h. The bore 126a is formed with an inlet port 126b, a first outlet port 126c, a second outlet port 126c, a third outlet port 126d, a fourth outlet port 126e, a fifth outlet port 126f, and a drain port 126g. The reduced diameter bore 126h is formed with a port 126i connected via an orifice 148 to the outlet port 126c and with a port 126j connected to an outlet port 150b of the shift command valve 150, which in turn is connected to the inlet port 150a. The inlet port 126b is connected to the outlet port 122d of the clutch release valve 122. The outlet port 126c is connected to a lock-up chamber 12a. The outlet port 126d is connected to the fluid coupling 12. The outlet port 126e is connected to a cooler 146. The outlet port 126f is connected to the lubrication system. The lock-up control valve 126 has a spool 126s having four lands 126m, 126n, 126o and 126p received in the bore section 126a and a land 126r received in the reduced diameter bore section 126h. The lock-up control valve 126 also has a spring 126t biasing the spool 126s. A relief valve 152 is connected to a passage 149 connected to the outlet port 126d at one end and to the fluid coupling 12 at the other end.

When the duty $DUTY_{128}$ is 0%, the lock-up control pressure $P_{LU}$ is zero or almost zero, allowing the spring 126t to move the spool 126s to a spring set position as illustrated in FIG. 2B. In this position, pressurized oil supplied from the outlet port 122d of the clutch relief valve 122 to the inlet port 126b of the lock-up control valve 126 is supplied via the outlet port 126c to the lock-up chamber 12a. This results in disengagement of the lock-up clutch 12d. As the duty $DUTY_{128}$ increases, the spool 126s moves against the spring 126t, increasing fluid communication between the outlet port 126c and the drain port 126g, resulting in gradual decrease in pressure within the lock-up chamber 12a. When the duty $DUTY_{128}$ is 100%, the lock-up control pressure $P_{LU}$ is as high as the pilot pressure, positioning the spool 126s at a lock-up position against the bias of the spring 126t. In the lock-up position, the lock-up chamber 12a is drained, resulting in engagement of the lock-up clutch 12d.

In addition to the inlet port 104a connected to the line pressure regulator valve 112, the manual selector valve 104 has a R range port 104b, a D range port 104c, a L range port 104d and two axially remotest drainages 104e and 104f. Cooperating with these ports is a manually operable spool 104i having two lands 104g and 104h. The spool 104i moves in response to positioning a selector lever (not shown) to any one of six detent positions, namely P (Park), R (Reverse), N (Neutral), D (Drive), and L. The R range port 104b is connected via a reverse brake control valve 140 to the reverse brake 50. The D and L range ports are connected via a forward clutch control valve 142 to the forward clutch 40.

In addition to the inlet port 129a, the clutch duty solenoid 129 has a drain port 129c and an outlet port 129b connected to ports 140h and 142h of the reverse brake control valve 140 and forward clutch control valve 142, respectively. When duty ($DUTY_{129}$) of the solenoid valve 129 is 100%, a needle closes the drain port 129c, allowing the full supply of the pilot pressure from the inlet port 129a to the outlet port 129b. When the duty $DUTY_{129}$ is 0%, the needle opens the drain port 129c, draining oil from the outlet port 129b. The duty $DUTY_{129}$ can be adjusted to any value falling in a range from 0% to 100%. Pressure appearing at the outlet port 129b, which may be called as a clutch control pressure, varies continuously between the lowest level and the highest level as high as the pilot pressure as $DUTY_{129}$ varies continuously between 0% and 100%. In other words, the clutch control pressure is proportional to $DUTY_{129}$.

In addition to the port 140h, the reverse brake control valve 140 has an inlet port 140a connected to the R range port 104b, an outlet port 140d and a feedback port 140g connected via an orifice 140f to the outlet port 140d. The outlet port 140d is connected to the reverse brake 50. The reverse brake control valve 140 has a spool 140m having three lands 140i, 140j and 140k, and a spring 140n biasing the spool 140m. Fluidly disposed between the outlet port 140d and the reverse brake 50 are a discharge flow restricting orifice 140b bypassed by a one-way check valve 140o and a supply flow restricting orifice 140c bypassed by a one-way check valve 140p. Oil to be supplied to the reverse brake 50 passes through the check valve 140o and supply flow restricting orifice 140c. Oil to be discharged from the reverse brake 50 passes through the check valve 140p and discharge flow restricting orifice 140b.

In addition to the port 142h, the forward clutch control valve 142 has a port 142b connected to the D range port 104c, a port 142e connected to the L range port 104d, an outlet port 142d connected to the forward clutch 40, and a feedback port 142g connected via an orifice 142f to the outlet port 142d. The forward clutch control valve 142 has a spool 142m having three lands 142i, 142j and 142k, and a spring 142n biasing the spool 142m. Fluidly disposed between the outlet port 142d and the forward clutch 40 are a discharge flow restricting orifice 142b bypassed by a one-way check valve 142o and a supply flow restricting orifice 142c bypassed by a one-way check valve 142p. Oil to be supplied to the forward clutch 40 passes through the check valve 142o and supply flow restricting orifice 142c. Oil to be discharged from the forward clutch 40 passes through the check valve 142p and discharge flow restricting orifice 142b. It is to be noted that, at the shift position D, the L range port 104d is drained, and the port 142e becomes a drain port and the port 142b becomes an inlet port. At the shift position L, the D range port 104c is drained, and the port 142b becomes a drain port and the port 142e becomes an inlet port.

The reverse brake and forward clutch valves 140 and 142 are identical in construction and function. Let us now consider the case when the shift position D is chosen. The D range port 104c is supplied with line pressure from the inlet port 104a and the L range port 104d is drained. If the clutch control pressure at the port 142h is zero ($DUTY_{129}=0\%$), the forward clutch control valve 142 generates at the outlet port 142d a servo activating pressure that is determined by a differential area between the lands 142i and 142j and the bias force of the spring 142n. As the clutch control pressure increases, the force acting on the land 142i against the spring 142n increases and thus the servo activating pressure at the port 142d decreases. When the clutch control pressure is as high as the pilot pressure ($DUTY_{129}=100\%$), the servo acting pressure is zero or almost zero. From the preceding, it is now understood, the servo activating pressure supplied to the forward clutch 40 or reverse brake 50 can be altered by varying the duty $DUTY_{129}$.

The stepping motor 108 and the three duty solenoid valves 120, 128 and 128 are under the control of a CVT controller 300.

Figure 3:
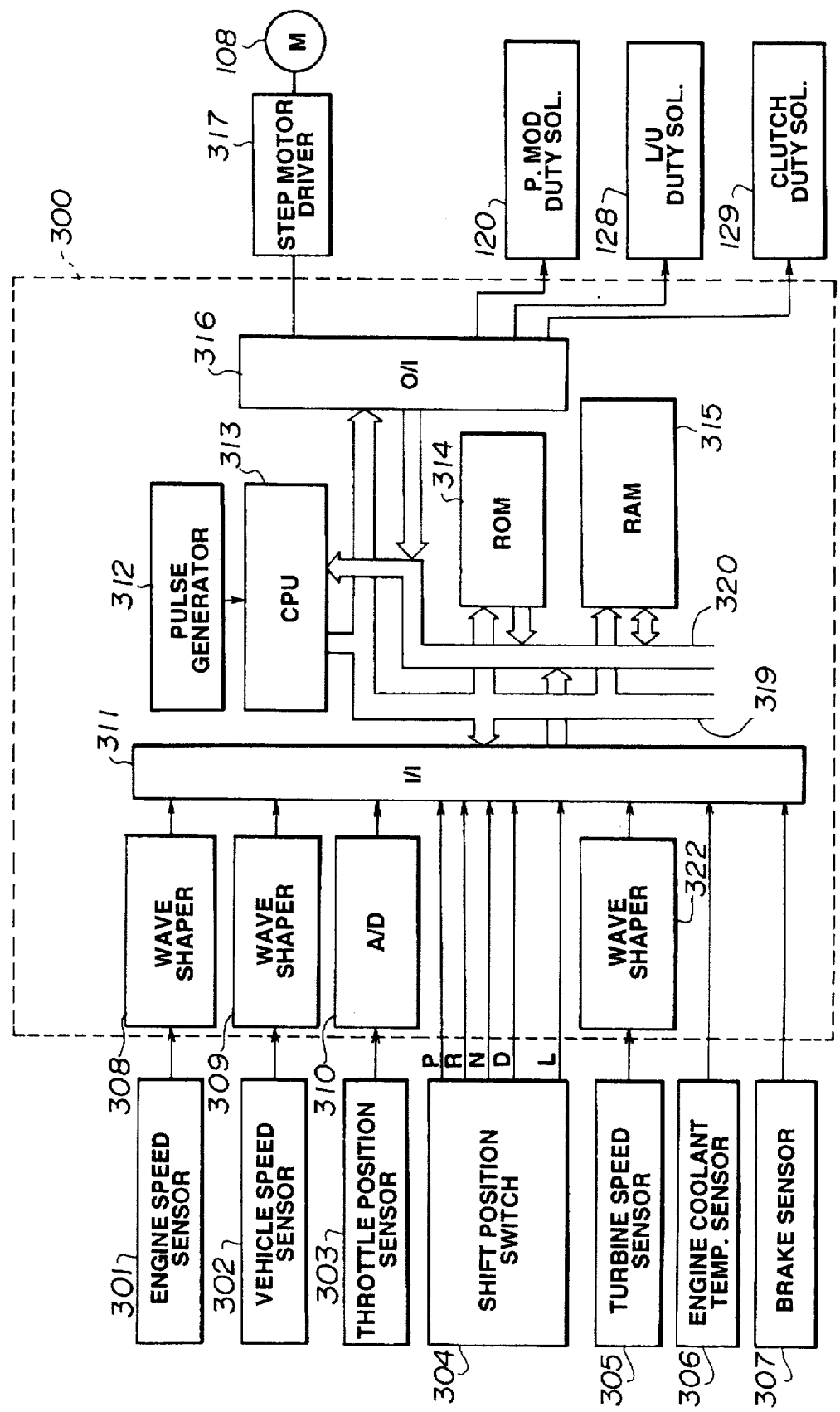
FIG. 3 is a block diagram of a CVT controller.

Referring to FIG. 3, the controller 300 receives output signals of a plurality of sensors and switch, which detect operating variables of which motor vehicle. The plurality of sensors and switch comprise an engine speed sensor 301, a vehicle speed sensor 302, a throttle position sensor 303, a shift position switch 304, a turbine speed sensor 305, an engine coolant temperature sensor 306, and a brake sensor 307.

The engine speed sensor 301 detects an engine revolution speed by counting the number of engine ignition spark pulses. The vehicle speed sensor 302 detects revolution speed of the output shaft of the CVT 29 and generates the result as a vehicle speed signal. The throttle opening sensor 303 detects an opening degree of the throttle 4. The shift position switch 304 detects which of different shift positions P, R, N, D, and L the manual selector valve 104 is placed at. The turbine speed sensor 305 detects revolution speed of the turbine shaft 13. The engine coolant temperature sensor 306 generates an output when the engine coolant temperature is lower than a predetermined value. The brake sensor 307 detects whether a foot brake is pressed or not.

Outputs of the throttle position sensor 303 is converted into a digital form at an A/D converter 310, and fed to an input interface 311. Outputs of the engine speed sensor 301, vehicle speed sensor 302, and turbine speed sensor 305 are supplied via the associated wave shapers 308, 309 and 322 to the input interface 311. Outputs of the shift position switch 304, engine coolant temperature sensor 306 and brake sensor 307 are supplied to the input interface 311.

The controller 300 is of a microcomputer based control unit and comprises the input interface 311, a CPU (central processor unit) 313, a reference pulse generator 312, a RAM (random access memory) 315, and an output interface 316. These elements are interconnected by an address bus 319 and a data bus 320. The reference pulse generator 312 generates reference pulse on which the CPU 313 operates. The RAM 315 temporarily stores information from various sensors and switches and parameters necessary for control. Outputs of the controller 300 are supplied via the output interface 316 to a stepping motor driver 317 and also to the pressure modifier duty solenoid valve 120, lock-up duty solenoid valve 128 and clutch duty solenoid valve 129.

Figure 4:
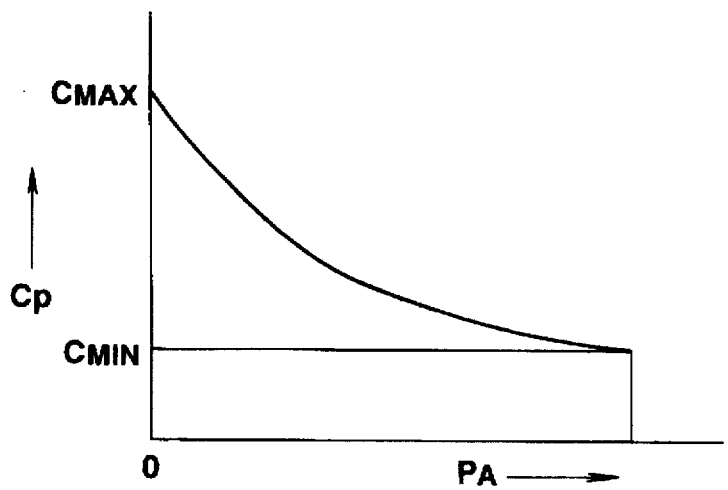
FIG. 4 shows, in the fully drawn line, a $C_P$ (CVT ratio) versus $P_A$ (actual step number) characteristic curve.

FIG. 4 shows variation of the CVT ratio $C_P$ against variation of an actual step number $P_A$, of the stepping motor 108, determined by the CVT controller 300. The setting is such that the CVT ratio $C_P$ is the largest or maximum ratio $C_{MAX}$ when the actual step number $P_A$ is zero and decreases toward the smallest or minimum ratio $C_{MIN}$ as the actual step number $P_A$ increases from zero.

Figure 5A:
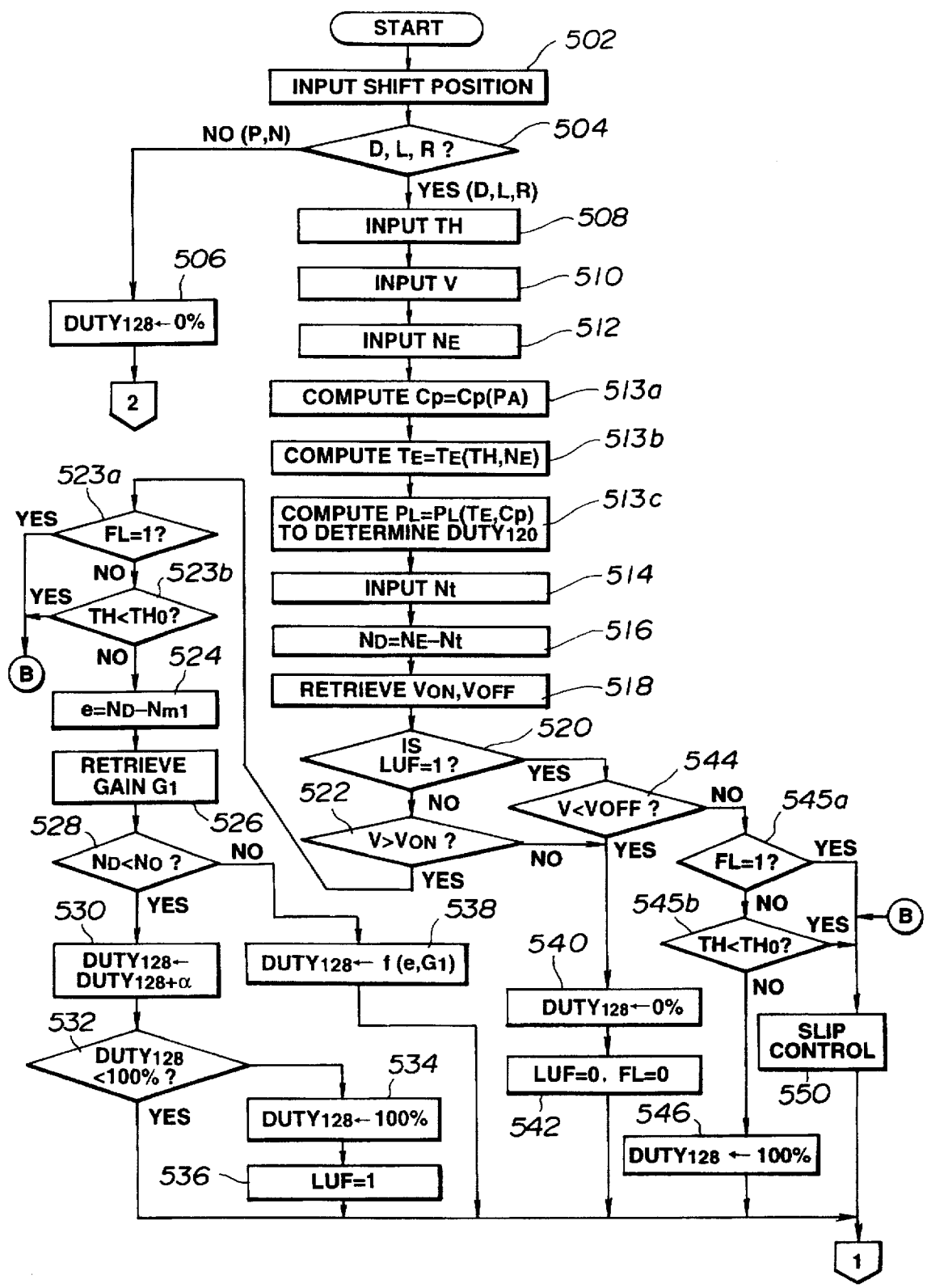
FIGS. 5A and 5B, when combined, are a flow diagram of a main control routine responsible for line pressure control, lock-up control and creep control and CVT ratio control.
Figure 5B:
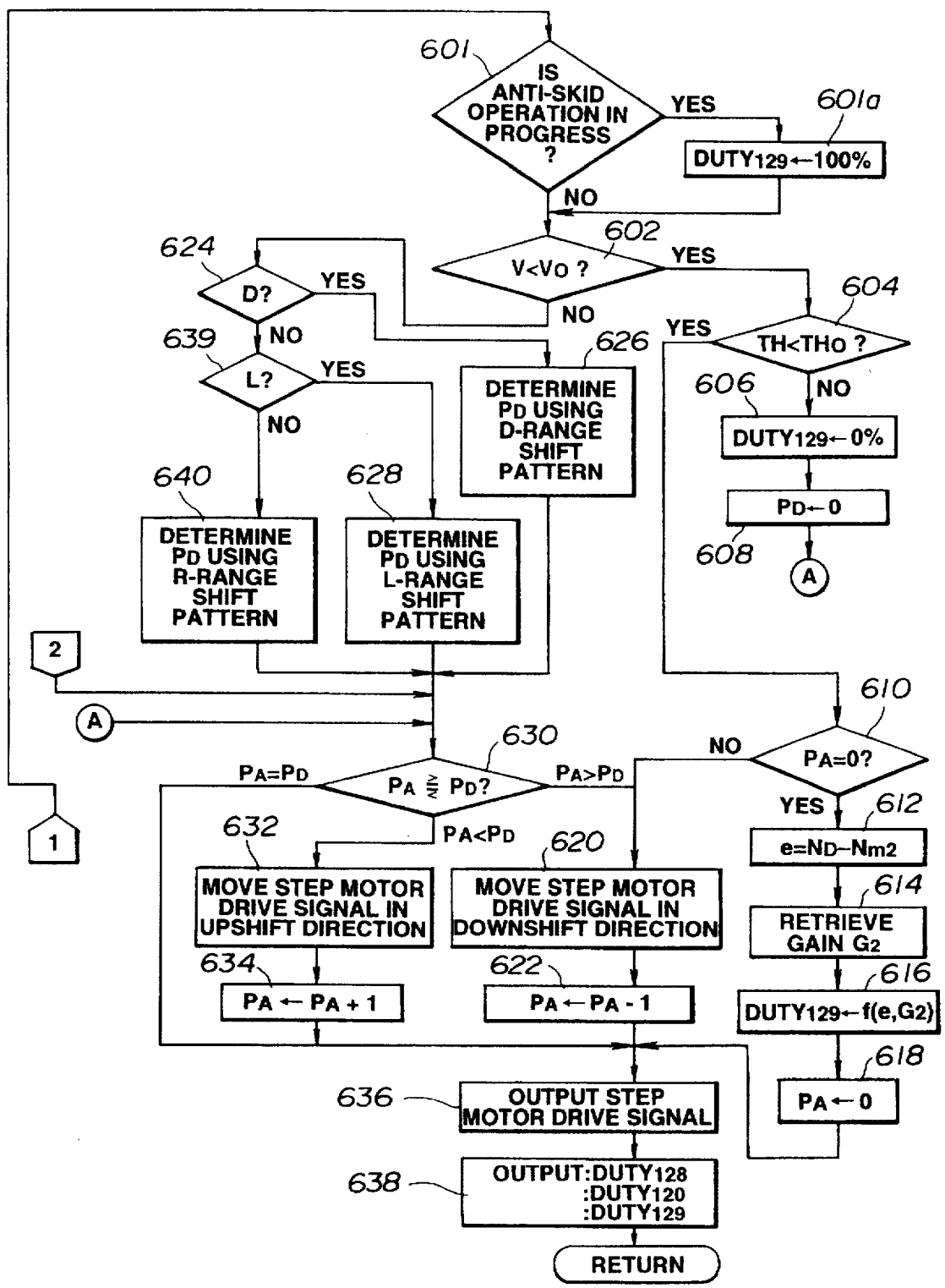
Figure 11:
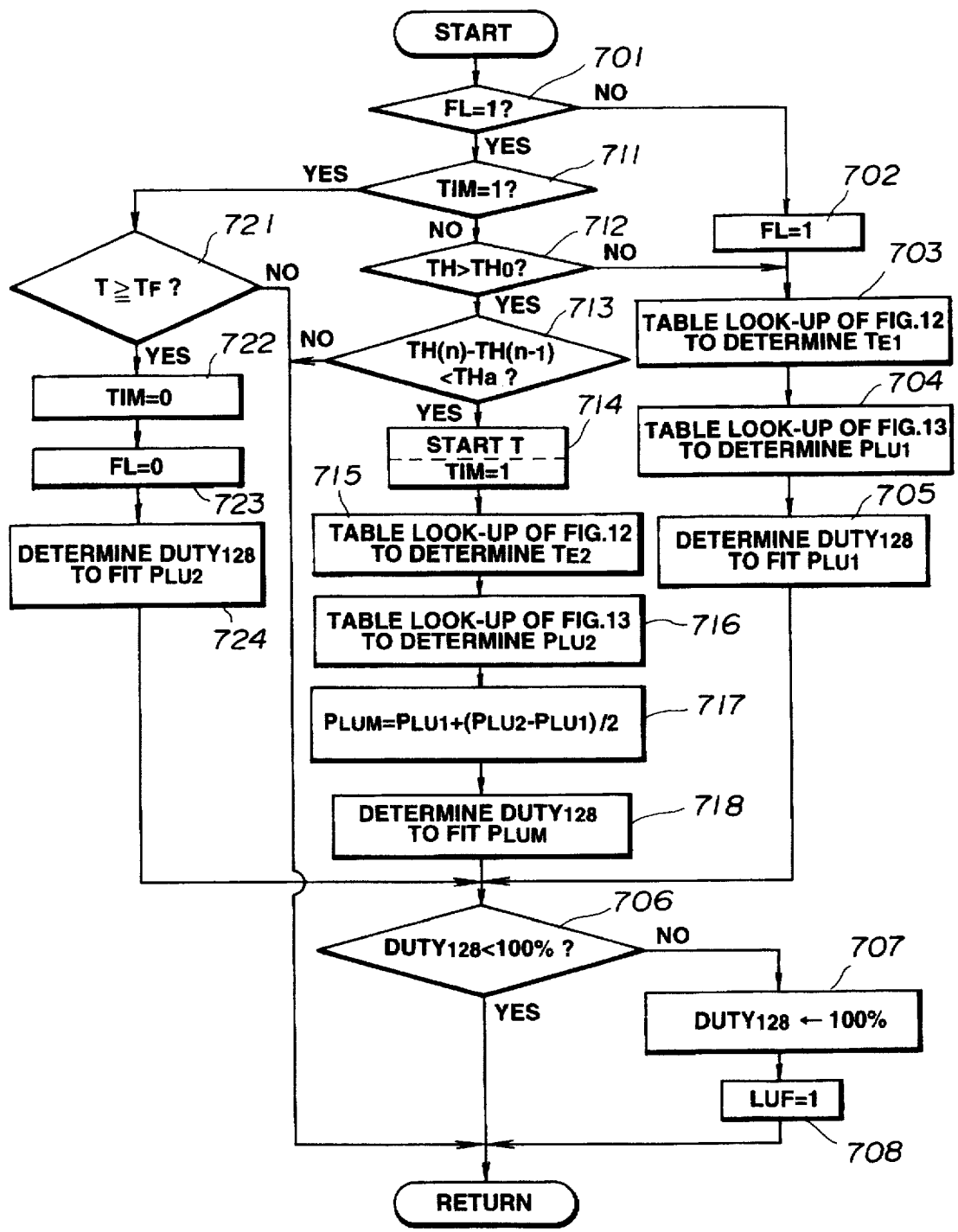
FIG. 11 is a flow diagram illustrating a control routine of lock-up slip control.

A preferred implementation of the present invention may be understood with reference to a main control routine illustrated by the flow diagram of FIGS. 5A and 5B and a sub-routine illustrated by the flow diagram of FIG. 11.

At input box 502, the controller 300 inputs information of transmission shift position, namely, P (Park), R (Reverse), N (Neutral), D (Drive), and L, after performing reading operation of output of the shift position switch 314 through the input interface 311. The controller 300 next determines, at box 504, whether the operator has chosen one of D, L and R or one of P and N.

If the operator has chosen P or N, the controller 300 sets the duty $DUTY_{128}$ to be output to the lock-up duty solenoid 128 equal to 0% at box 506. The controller 300 then compares the actual step number $P_A$ with desired step number $P_D$ at box 630.

If the operator has chosen D or L or R, the controller 300 inputs information of throttle opening degree TH at box 508, and vehicle speed V at box 510. At box 508, the controller 300 performs reading operation of output of the throttle opening degree or position sensor 303 through the input interface 311.

At the next box 512, the controller 300 inputs information of engine speed $N_E$. In box 512, the controller 300 performs reading operation of output of the engine speed sensor 301 through the input interface 311.

Figure 6:
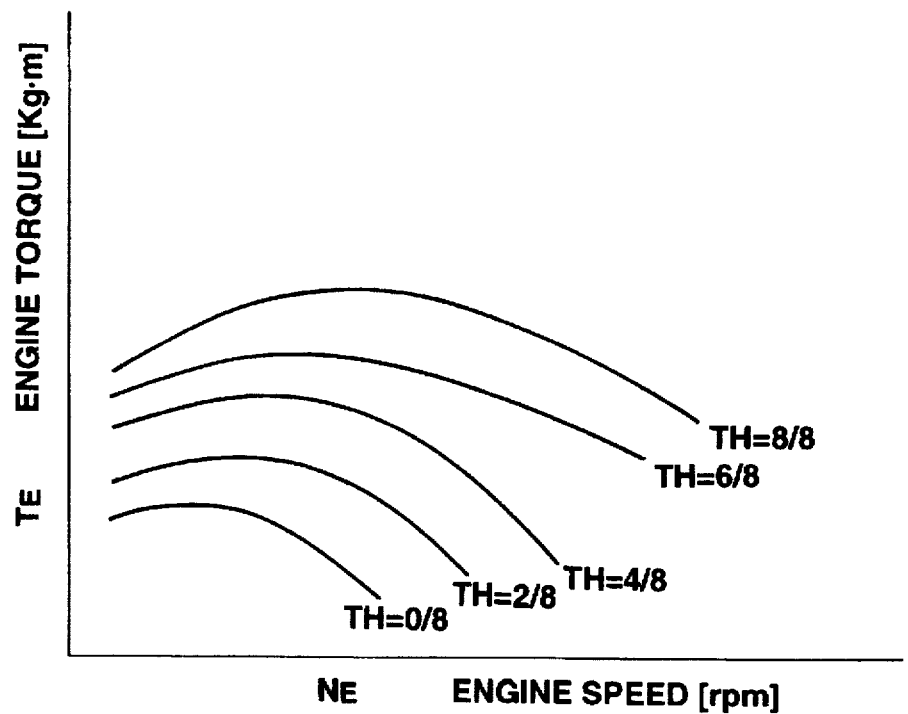
FIG. 6 shows a family of $T_E$ (engine torque) versus $N_E$ (engine speed) characteristic curves in response to TH (throttle opening degree) of the engine.

The controller 300 computes the CVT ratio $C_P$ at box 513a, engine torque $T_E$ at box 513b, and line pressure $P_L$ at box 513c. In box 513a, the controller 300 performs a table look-up operation of FIG. 4 using the actual step number $P_A$ to determine CVT ratio $C_P$. In box 513b, the controller 300 performs a table look-up operation of FIG. 6 using throttle opening degree TH and engine speed $N_E$ to determine engine torque $T_E$. In box 513c, the controller 300 performs a table look-up operation of FIG. 7 using engine torque $T_E$ and CVT ratio $C_P$ and determines duty $DUTY_{120}$ to be output to the pressure modifier duty solenoid valve 120 for generation of line pressure $P_L$ required.

At box 514, the controller 300 inputs information of turbine speed Nt. In box 514, the controller 300 performs reading operation of output of the turbine speed sensor 305 through the input interface 311.

Figure 8:
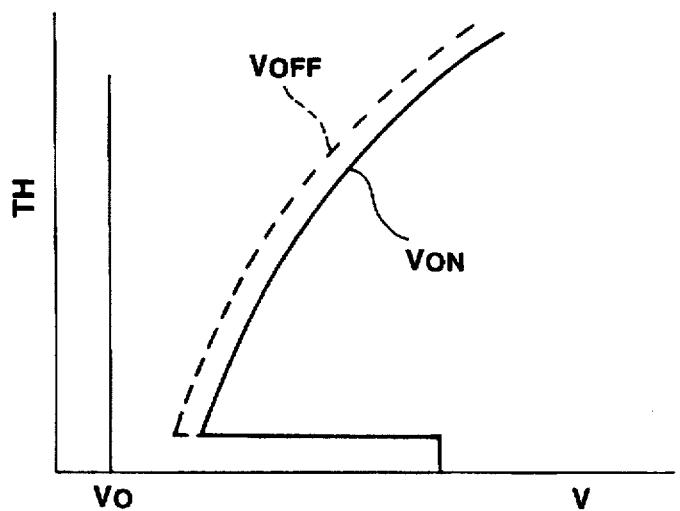
FIG. 8 shows a lock-up on vehicle speed $V_{ON}$ and a lock-up off vehicle speed $V_{OFF}$ along with a threshold vehicle speed $V_0$ of CVT ratio control.

The controller 300 computes a deviation $N_D$ at box 516 by subtracting the turbine speed Nt from the engine speed $N_E$. At box 518, a table look-up operation of FIG. 8 is performed using the throttle opening degree TH and the vehicle speed V to determine a lock-up on vehicle speed $V_{ON}$ and a lock-up off vehicle speed $V_{OFF}$.

The controller 300, next, determines whether a lock-up flag LUF is set equal to 1 at box 520. If lock-up flag LUF is set equal to 1, the controller 300 goes to box 544. If lock-up flag LUF is not equal to 1, the controller 300 goes to box 522. In box 544, the controller 300 determines whether vehicle speed V is less than lock-up off vehicle speed $V_{OFF}$. If V is less than $V_{OFF}$, the controller 300 goes to box 540. If V is not less than $V_{OFF}$, the controller 300 goes to box 545a.

Figure 9:
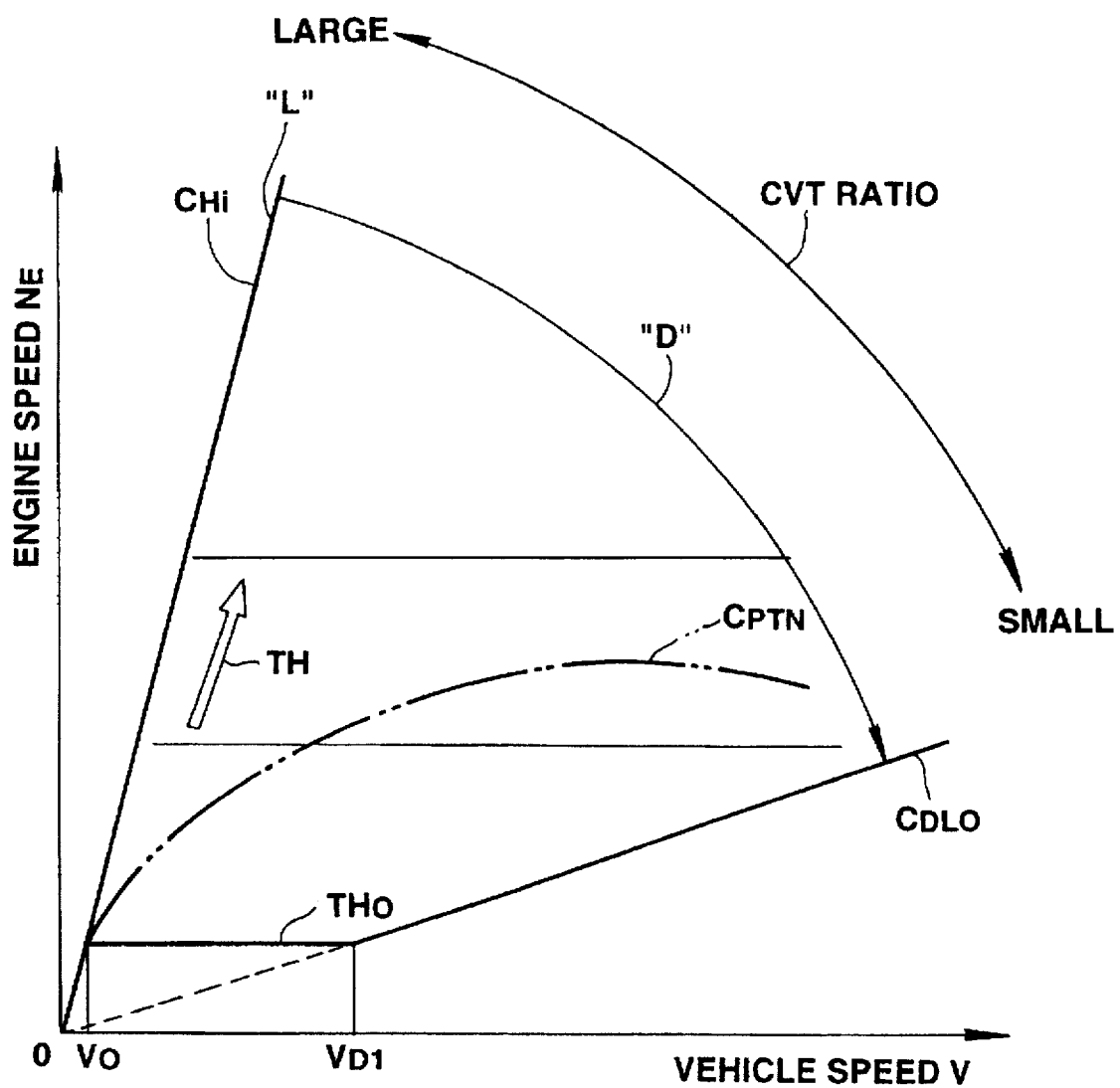
FIG. 9 is a graphical representation of extensions, in CVT ratio, of D range in comparison with fixed CVT ratio for L range.

In box 545a, the controller 300 determines whether a lock-up slip control flag FL is set equal to 1. Lock-up slip control flag FL is set equal to 1 when a lock-up slip control, which is later described, is in progress. If FL is set equal to 1, the controller 300 executes a sub-routine for lock-up slip control, at box 500, and, next, goes to box 601. If, at box 545a, FL is not equal to 1, the controller 300 determines whether throttle opening degree TH is less than critical throttle opening degree $TH_0$ of idle operation (see FIG. 9) at box 545b. If TH is less than $TH_0$, the controller 300 executes the routine for lock-up slip control at box 550 and, next, goes to box 601. If, at box 545b, TH is not less than $TH_0$, the controller 300 goes to box 546.

In box 522, the controller 300 determines whether vehicle speed V is greater than lock-up on vehicle speed $V_{ON}$. If V is greater than $V_{ON}$, the controller 300 goes to box 523a. If V is not greater than $V_{ON}$, the controller 300 goes to box 540. In box 523a, the controller 300 determines whether lock-up slip control flag FL is set equal to 1. If FL is set equal to 1, the controller 300 executes the sub-routine for lock-up slip control at box 550 and, next, goes to box 601. If, at box 523a, FL is not equal to 1, the controller 300 determines whether throttle opening degree TH is less than critical throttle opening degree $TH_0$ of idle operation at box 523b. If TH is less than $TH_0$, the controller 300 executes the routine for lock-up slip control at box 550 and, next, goes to box 601. If, at box 523b, TH is not less than $TH_0$, the controller 300 goes to box 524.

In box 524, the controller 300 computes a desired deviation e by subtracting a preset first target value Nm1 from the deviation $N_D$ obtained at box 516. At box 526, the controller 300 performs a table look-up operation of a first feedback gain map to determine a first feedback gain $G_1$ for the desired deviation e. The controller 300 next determines at box 528 whether the deviation $N_D$ is less than a preset threshold value $N_0$. If, at box 528, the deviation $N_D$ is less than the preset threshold value $N_0$, the controller 300 goes to box 530. If, at box 528, the deviation $N_D$ is not less than the preset threshold value $N_0$, the controller 300 goes to box 538.

In box 530, the controller 300 increases the duty $DUTY_{128}$ to be output to the lock-up duty solenoid valve 128 by a preset small value alpha. The controller 300, next, determines whether the duty $DUTY_{128}$ is less than 100% at box 532. If $DUTY_{128}$ is not less than 100%, the controller 300 sets $DUTY_{128}$ equal to 100% at box 534 and sets the lock-up flag LUF equal to 1 at box 536. Next, the controller 300 goes to box 601. If, at box 532, $DUTY_{128}$ is less than 100%, the controller 300 goes to box 601.

In box 538, the controller 300 determines $DUTY_{128}$ as a predetermined function of the deviation e and first feedback gain $G_1$. The controller 300, next, goes to box 601.

In box 540, the controller 300 sets $DUTY_{128}$ equal to 0%. At the next box 542, the controller 300 resets lock-up flag LUF (LUF=0) and resets lock-up slip control flag FL (FL=0). The controller 300, next, goes to box 601.

In box 546, the controller 300 sets $DUTY_{128}$ equal to 100% and goes to box 601.

In box 601, the controller 300 determines whether anti-skid operation is in progress. The vehicle is installed with a brake system, which is able to perform anti-skid operation to control slip rate of road wheels. The controller 300 communicates with a controller of the brake system to determine whether anti-skid operation is in progress.

If anti-skid operation is not in progress, the controller 300 determines at box 602 whether vehicle speed V is less than a threshold vehicle speed $V_0$ of ratio control. This threshold vehicle speed $V_0$ ranges from 2 km/h to 3 km/h and thus lower than lock-up on and lock-up off vehicle speeds $V_{ON}$ and $V_{OFF}$ (see FIG. 8).

If anti-skid operation is in progress, the duty $DUTY_{129}$ to be output to the clutch duty solenoid valve 129 is set equal to 100% at box 601a. The controller 300, next, goes to box 602.

If, at box 602, vehicle speed V is less than threshold vehicle speed $V_0$, the controller 300 determines that creep control is required and goes to box 604. If vehicle speed V is not less than threshold vehicle speed $V_0$, the controller 300 determines that ratio control is required and goes to box 624.

In box 604, the controller 300 determines whether TH is less than $TH_0$. If TH is less than $TH_0$, the controller 300 goes to box 610. If TH is not less than $TH_0$, the controller 300 sets $DUTY_{129}$ equal to 0% at box 606. The controller 300 next sets desired step number $P_D$ equal to 0 (zero) at box 608. Then, the controller 300 goes to box 630.

In box 610, the controller 300 determines whether actual step number $P_A$ is 0 (zero). If actual step number $P_A$ is zero ($P_A$=0), the controller 300 goes to box 612. If actual step number $P_A$ is not equal to zero, the controller 300 goes to box 620.

In box 612, the controller 300 computes desired deviation e by subtracting a preset second desired value Nm2 from deviation $N_D$. Next, the controller 300 performs, at box 614, a table look-up operation of a second feedback gain map to determine a second feedback gain $G_2$ for the desired deviation e. The controller 300, next, determines, at box 616, $DUTY_{129}$ as a predetermined function of the desired deviation e and second feedback gain $G_2$. Then, the controller 300 sets actual step number $P_A$ equal to 0 ($P_A$=0), at box 618, and goes to box 636.

In box 624, the controller 300 determines whether shift position is D range. If D range is chosen, the controller 300 performs a table look-up operation of a shift pattern map for D range based on vehicle speed V and throttle opening degree TH, at box 626, to determine a desired step number $P_D$ which establishes a CVT ratio for V and TH. Next, the controller 300 goes to box 630.

If, at box 624, D range is not chosen, the controller 300 determines, at box 639, whether shift position is L range. If L range is chosen, the controller 300 performs, at box 638, a table look-up operation of a shift pattern map for L range based on vehicle speed V and throttle opening degree TH to determine a desired step number $P_D$, which establishes a CVT ratio for V and TH. The controller 300 next goes to box 630. If, at box 639, L range is not chosen, the controller 300 performs, at box 640, a table look-up operation of a shift pattern map for R range based on vehicle speed V and throttle opening degree TH to determine a desired step number $P_D$, which establishes a CVT ratio for V and TH. The controller 300 next goes to box 630.

In box 630, the controller 300 compares actual step number $P_A$ with desired step number $P_D$. If $P_A$ is equal to $P_D$, the controller 300 goes to box 636. If $P_A$ is less than $P_D$, the controller 300 moves a stepping motor drive signal by one step in an upshift direction at box 632 and increases actual step number $P_A$ by one at box 634. The controller 300, next, goes to box 636.

If, at box 630, $P_A$ is greater than $P_D$, the controller 300 moves stepping motor drive signal by one step in a downshift direction at box 620 and decreases $P_A$ by one at box 622. The controller 300, next, goes to box 636.

In box 636, the controller 300 outputs the stepping motor drive signal to stepping motor driver 317. In box 638, the controller 300, next, outputs $DUTY_{120}$, $DUTY_{128}$ and $DUTY_{129}$ to pressure modifier duty solenoid 120, lock-up duty solenoid 128 and clutch duty solenoid 129, respectively.

The stepping motor driver 317 causes the stepping motor 108 to turn by one step in a direction designated in response to a shift in the stepping motor drive signal.

Varying the duty $DUTY_{129}$ of clutch duty solenoid 129 alters degree of engagement of the forward clutch 40 if it is selected by the manual selector valve 104 or the reverse brake 50 if it is selected by the manual selector valve 104. Complete engagement is accomplished if $DUTY_{129}$ is 0%, while complete disengagement if $DUTY_{129}$ is 100%. The degree of slip of forward clutch 40 or reverse brake 50 increases continuously as $DUTY_{129}$ increases so that the slip can be adjusted to a desired degree corresponding to the value of $DUTY_{129}$.

Creep control is initiated if $P_A=0$ (at box 610) under conditions when $TH<TH_0$ (at box 604) with $V<V_0$ (at box 602) and the degree of slip is determined at box 616.

The D-range shift pattern is a map containing a set of values, which CVT ratio may take against various combinations of throttle opening degree TH and vehicle speed V. This set of values can be plotted in FIG. 9 within a zone between the fully drawn lines $C_{Hi}$ and $C_{DLO}$. A curve $C_{PTN}$ drawn by the two-dot chain line illustrates gradual increase of engine speed $N_E$ versus vehicle speed V during gradual acceleration with the shift position D chosen by the operator.

The L-range shift pattern is a map containing still another set of values that CVT ratio may take against various combinations of throttle opening degree TH and vehicle speed V. This still another set of values can be plotted in FIG. 9 on the fully drawn line $C_{Hi}$. In other words, CVT ratio is held at $C_{Hi}$ according to L-range shift pattern.

The D-range, L-range and R-range shift pattern maps are programmed in the form of map in ROM 314 of the controller 300.

As is readily seen from the flow diagram of FIGS. 5A and 5B, the controller 300 outputs $DUTY_{128}$ at box 638, causing the lock-up duty solenoid 128 to generate the lock-up control pressure $P_{LU}$. As discussed before, the lock-up control pressure $P_{LU}$ is proportional to $DUTY_{128}$. The lock-up clutch 12d is completely engaged when $DUTY_{128}$ is 100% and the lock-up control pressure $P_{LU}$ is the highest, while engagement of the lock-up clutch 12d is completely released when $DUTY_{128}$ is 0% and the lock-up control pressure $P_{LU}$ is zero. Torque transmitting capacity of the lock-up clutch 12d is the highest during complete engagement of the lock-up clutch 12d. Under this condition, all of engine torque is mechanically transmitted by the lock-up clutch 12d. When the lock-up clutch 12d is released, all of engine torque is hydraulically transmitted by the fluid coupling 12. During engagement of the lock-up clutch 12d, if $DUTY_{128}$ is varied to alter the lock-up control pressure $P_{LU}$, torque transmitting capacity of the lock-up clutch 12d varies, accordingly. The less $DUTY_{128}$ is, the less the lock-up control pressure $P_{LU}$ and torque transmitting capacity of the lock-up clutch 12d are. Torque transmitting capacity of the lock-up clutch 12d varies with the lock-up control pressure $P_{LU}$. If torque transmitting capacity of the lock-up clutch 12d decreases, a portion of torque transmitted by the fluid coupling 12 increases. Thus, if the controller 300 decreases $DUTY_{128}$ from 100% to cause a drop of torque transmitting capacity of the lock-up clutch 12d, a portion of engine torque transmitted by the fluid coupling 12 increases.

Let us now assume that the vehicle is being accelerated from zero speed with the gas pedal 2 depressed by operator to open the throttle 4 to opening degree, for example, ⅝ of the fully opened position. Vehicle speed V increases. Immediately after V has exceeded the lock-up on vehicle speed $V_{ON}$, the controller 300 determines that V is greater than $V_{ON}$ at box 522, determines $DUTY_{128}$ as the function of e and $G_1$ at box 538 and outputs the determined $DUTY_{128}$ at box 638. As $DUTY_{128}$ at box 538 increases, the lock-up control pressure $P_{LU}$ increases and torque transmitting capacity of the lock-up clutch 12d increases, causing the deviation $N_D$ to decrease. Subsequently, immediately after $N_D$ has become less than $N_0$, the controller 300 determines that $N_D$ is less than $N_0$ at box 528 and next increases $DUTY_{128}$ by small value of alpha at box 530. Thereafter, $DUTY_{128}$ increases at the rate of alpha until $DUTY_{128}$ reaches 100%. Immediately after $DUTY_{128}$ has attained 100%, the controller 300 sets lock-up flag LUF equal to 1 at box 536. This is the moment when complete engagement of the lock-up clutch 12d is attained and the fluid coupling 12 locks up.

Figure 14A:
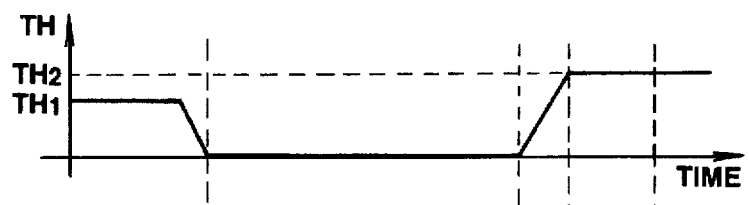
FIGS. 14A, 14B, 14C, 14D, 14E and 14F are timing diagrams.
Figure 14B:
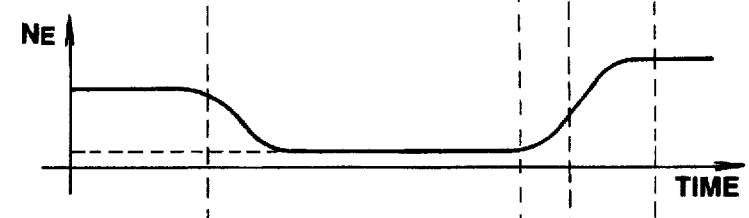
Figure 14C:
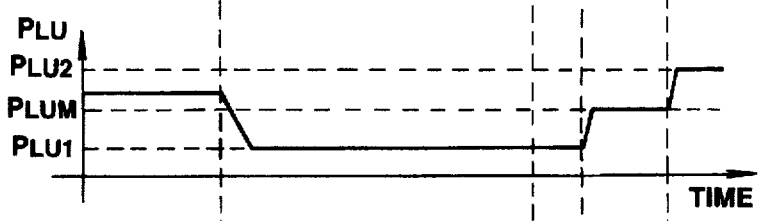

Let us now consider the case when the operator releases the gas pedal 2 immediately after vehicle speed V has exceeded lock-up on vehicle speed $V_{ON}$ but before the controller 300 sets the lock-up flag LUF equal to 1 at box 536 and subsequently steps on the gas pedal 2 to open the throttle 4 to throttle opening degree, for example, ⅝ of the fully opened position. The controller 300 determines, at box 523b, that throttle opening degree TH is less than the critical throttle opening degree $T_0$ of idle operation and then goes to box 550 to initiate execution of lock-up slip control. At beginning of the lock-up slip control, the controller 300 sets the lock-up slip control flag FL equal to 1. This flag FL is kept equal to 1 until it is cleared at ending of the lock-up slip control. Thus, after the lock-up slip control has been initiated, the controller 300 determines, at box 523a, that the slip control flag FL is set equal to 1 and goes to box 550 as long as vehicle speed V stays greater than the lock-up on vehicle speed $V_{ON}$ (see box 522). FIG. 14A illustrates variation of throttle opening degree TH. FIG. 14B illustrates variation of engine speed $N_E$ in response to the variation of throttle opening degree TH. FIG. 14C illustrates variation of lock-up control pressure $P_{LU}$ according to the lock-up slip control.

Figure 12:
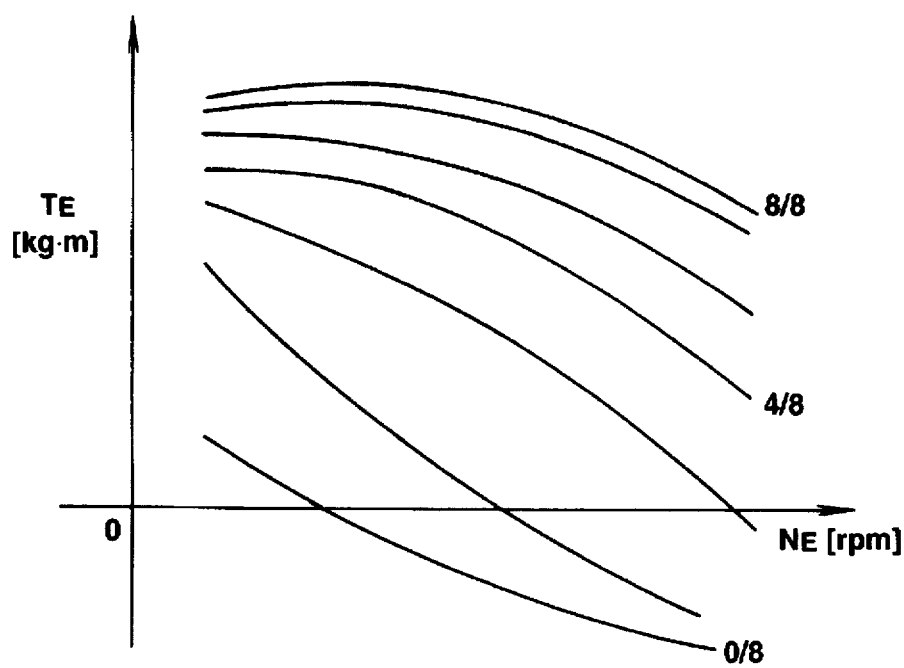
FIG. 12 shows a family of $T_E$ (engine torque) versus $N_E$ (engine speed) characteristic curves of engine-CVT drivetrain in response to TH (throttle opening degree) of the engine.
Figure 13:
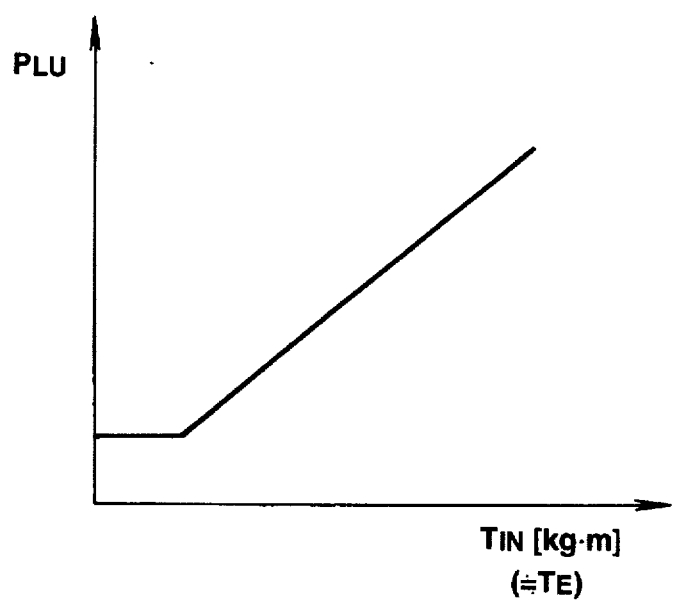
FIG. 13 shows a desired relationship between lock-up control pressure $P_{LU}$ and CVT input shaft torque $T_{IN}$.

In FIGS. 14A, 14B and 14C, the throttle opening degree TH is maintained at $TH_1$ prior to moment $t_1$. At moment $t_1$, the throttle opening degree TH has dropped below $TH_0$. This change in throttle opening degree TH causes the CVT 29 to upshift. Between moments $t_1$ and $t_2$, the lock-up slip control determines engine torque $T_E$ against engine speed $N_E$ and throttle opening degree TH using engine torque vs. engine speed characteristic curves shown in FIG. 12 and determines the lock-up control pressure $P_{LU}$ against the determined torque $T_E$ using the relationship illustrated in FIG. 13. FIG. 12 illustrates a family of engine torque vs. engine speed ($T_E$ vs. $N_E$) characteristic curves of vehicle engine-CVT drivetrain for various throttle opening degrees TH. FIG. 13 illustrates the desired relationship between lock-up control pressure $P_{LU}$ and CVT input torque $T_{IN}$. In FIG. 12, an appropriate one of the characteristic curves is chosen for throttle opening degree TH. The determined engine torque $T_E$ is used as the input torque $T_{IN}$ in determining the lock-up control pressure $P_{LU}$ using the relationship illustrated in FIG. 13. For, ease of understanding, the lock-up control pressure, which varies from moment $t_1$ to moment $t_2$, is labelled as $P_{LU1}$. As shown in FIG. 14C, immediately after moment $t_1$, the lock-up control pressure $P_{LU1}$ drops in response to drop of engine speed $N_E$. At moment $t_2$, the throttle opening degree TH begins to increase toward $TH_2$ in response to beginning of depression of gas pedal 2. At moment $t_3$, the throttle opening degree TH reaches $TH_2$. In response to this change in throttle opening degree TH from $TH_1$ to $TH_2$, the engine speed $N_E$ increases immediately after moment $t_2$. This change in throttle opening degree TH causes the CVT 29 to downshift, accelerating the input shaft 14 of the CVT 29, causing a further increase in engine speed $N_E$. According to the lock-up slip control, the lock-up control pressure $P_{LU1}$ determined at moment $t_2$ is maintained during moments $t_2$ and $t_3$ (see FIG. 14C). At moment $t_3$, the controller 300 chooses an appropriate one engine torque vs. engine speed characteristic curve for $TH_2$ out of the family of characteristic curves illustrated in FIG. 12, uses this curve to determine engine torque $T_{E2}$ against engine speed $N_E$ determined at moment $t_3$ and throttle opening degree TH, and determines the lock-up control pressure $P_{LU2}$ against the determined engine torque $T_{E2}$ using the relationship illustrated in FIG. 13. It is assumed that the lock-up pressure determined at moments $t_2$ and $t_3$ are $P_{LU1}$ and $P_{LU2}$, respectively. The controller 300 determines, at moment $t_3$, a middle pressure $P_{LUM}$ which is expressed as $P_{LUM}=P_{LU1}+(P_{LU2}-P_{LU1})/2.$ Immediately after moment $t_3$, the lock-up control pressure $P_{LU}$ increases to the middle pressure $P_{LUM}$. This middle pressure $P_{LUM}$ is maintained for a predetermined period of time $T_F$, for example, 0.5 seconds. At moment $t_4$ when the predetermined period of time $T_F$ has passed, the lock-up control pressure $P_{LU}$ increases toward the lock-up control pressure $P_{LU2}$ and the slip control flag FL is reset. Thus, torque transmitting capacity of the lock-up clutch 12d is reinstated thereafter.

Referring to FIG. 5A, the controller 300 initiates the execution of the lock-up slip control at box 550 when TH is less than $TH_0$ (box 545b) under conditions when the lock-up flag LUF is set (box 520) and V is not less than $V_{OFF}$ (box 544).

The flow diagram of FIG. 11 illustrates a control routine of the lock-up slip control discussed above in relationship to FIGS. 12, 13, and FIGS. 14A, 14B and 14C.

In box 701, the controller 300 determines whether lock-up slip control flag FL is set equal to 1. The controller 300 next sets the flag FL equal to 1 at box 702. The controller 300 performs table look-up operation of FIG. 12 based on throttle opening degree TH and engine speed $N_E$ to determine engine torque $T_{E1}$ at box 703. The controller 300 next performs table look-up operation of FIG. 13 based on the engine torque $T_{E1}$ to determine lock-up control pressure $P_{LU1}$. In performing the table look-up operation of FIG. 13, the determined engine torque is used as CVT input torque $T_{IN}$.

The controller 300, next, determines, at box 705, $DUTY_{128}$ with which the lock-up duty solenoid 128 can produce the determined lock-up control pressure $P_{LU1}$. In the next box 706, the controller 300 determines whether $DUTY_{128}$ is less than 100%. If $DUTY_{128}$ is less than 100%, the controller 300 returns to the main routine at box 601. If $DUTY_{128}$ is not less than 100%, the controller 300 sets $DUTY_{128}$ equal to 100% at box 707. The controller 300, next, sets the lock-up flag LUF equal to 1 at box 708 and then returns to the main routine at box 601.

If, at box 701, the lock-up slip control flag FL has been set equal to 1, the controller 300 determines, at box 711, whether a timer flag TIM is set equal to 1. If the timer flag TIM is not equal to 1, the controller 300 determines whether TH is greater than $TH_0$ at box 712. If TH is not greater than $TH_0$, the controller 300 goes to box 703.

If, at box 712, TH is greater than $TH_0$, the controller 300 determines, at box 713, whether rate of increase of throttle opening degree TH, which is expressed by a subtract of the previous throttle opening degree data TH(n−1) from the present throttle opening degree data TH(n), is less than a predetermined small value THa. If TH(n)-TH(n−1) is less than THa, the controller 300 starts a timer T and sets the timer flag TIM equal to 1 at box 714. The controller 300, next, goes to box 715. If, at box 713, TH(n)-TH(n−1) is not less than THa, the controller 300 returns to the main routine at box 601.

In box 715, the controller 300 performs table look-up operation of FIG. 12 based on throttle opening degree TH and engine speed $N_E$ to determine engine torque $T_{E2}$. In the next box 716, the controller 300 performs table look-up operation of FIG. 13 based on the engine torque $T_{E2}$ to determine lock-up control pressure $P_{LU2}$. The controller 300, determines middle lock-up control pressure $P_{LUM}$, at box 717, by calculating the following equation, $P_{LUM}=P_{LU1}+(P_{LU2}-P_{LU1})/2.$ In the next box 718, the controller 300 determines $DUTY_{128}$ with which the lock-up duty solenoid 128 can produce the determined middle lock-up control pressure $P_{LUM}$. The controller 300, next, goes to box 706.

If, at box 711, the timer flag TIM is set equal to 1, the controller 300 determines whether the timer T has counted the predetermined period of time $T_F$. If T is less than $T_F$, the controller 300 returns to the main routine at box 601 (see FIG. 5B). If T is greater than or equal to $T_F$, the controller 300 resets the timer flag TIM at box 722 and resets the lock-up slip control flag FL at box 723. In the next box 724, the controller 300 determines $DUTY_{128}$ with which the lock-up duty solenoid 128 can produce the determined lock-up control pressure $P_{LU2}$. The controller 300 next goes to box 706.

The predetermined period of time $T_F$ is 0.5 seconds in this embodiment. This period of time may be appropriately set taking due consideration of variation of output shaft torque owing to increase of engine speed after depression of gas pedal 2.

Referring also to FIG. 14C, at or immediately after moment $t_1$, the controller 300 goes through boxes 701, 702, 703, 704, 705, and 706 before returning to the main routine at box 601. Between moments $t_1$ and $t_2$, the controller 300 repeats flow along boxes 701, 711, 712, 703, 704, 705, and 706. At moment $t_2$, the controller 300 goes through boxes 701, 711, 712, and 713 before returning to the main routine at box 601. Between moments $t_2$ and $t_3$, the controller 300 repeats flow along boxes 701, 711, 712, and 713. At or immediately after moment $t_3$, the controller 300 goes through boxes 701, 711, 712, 713, 714, 715, 716, 717, 718 and 706 before returning to the main routine at box 601. Between moments $t_3$ and $t_4$, the controller 300 repeats flow along boxes 701, 711, and 721. At or immediately after moment $t_4$, the controller 300 goes through boxes 701,711, 721, 722, 723, 724, and 706.

According to the control routine illustrated in FIG. 11, the lock-up control pressure $P_{LU}$ is increased in discrete manner between moments $t_3$ and $t_4$ as shown in FIG. 14C. The lock-up control pressure $P_{LU}$ may be increased at a predetermined rate between moments $t_3$ and $t_4$ as shown in FIG. 14D.

Figure 14D:
Figure 15:
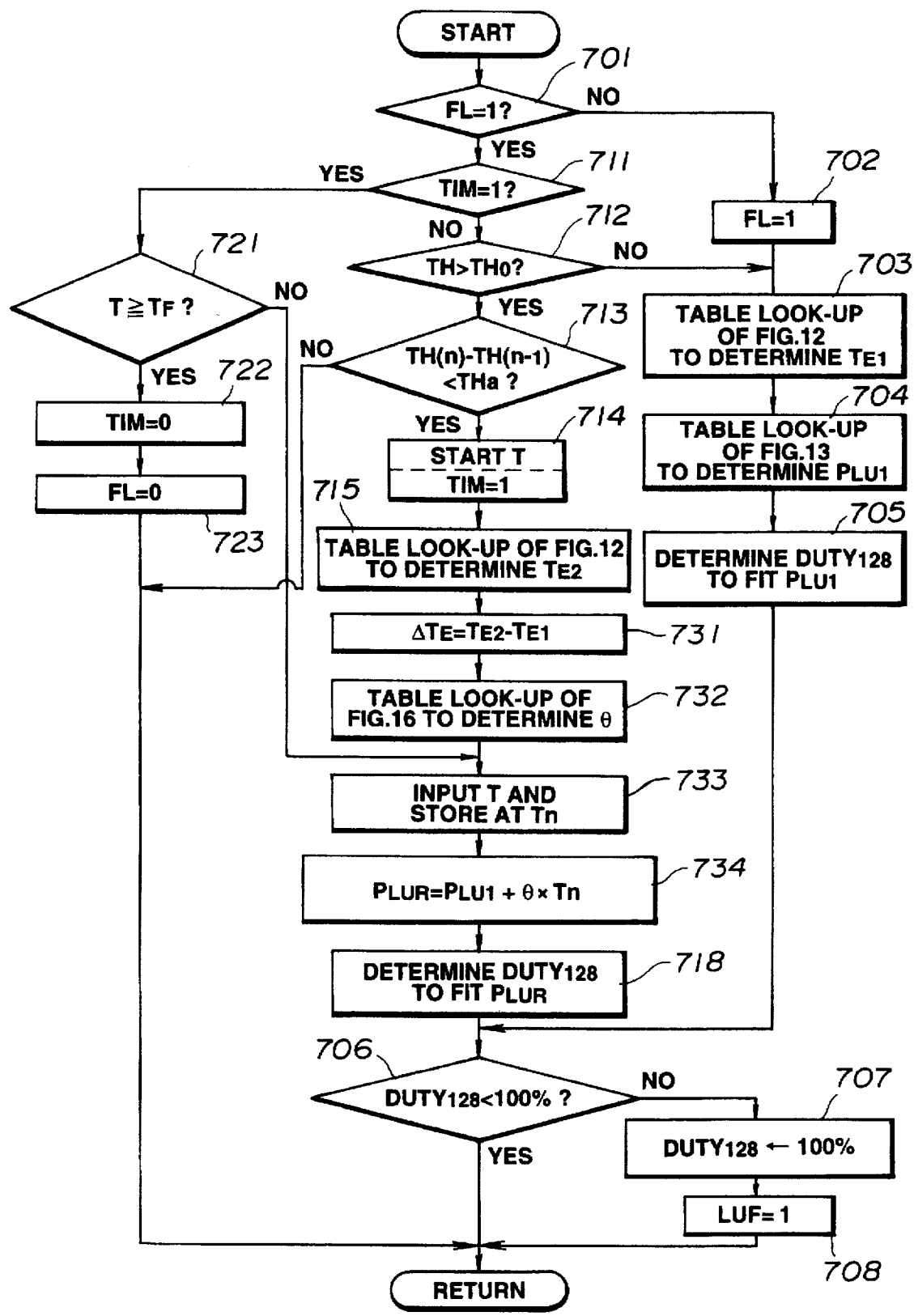
FIG. 15 is a flow diagram illustrating another control routine of lock-up slip control.

The flow diagram of FIG. 15 illustrates a control routine of lock-up slip control shown in FIG. 14D.

This control routine illustrated in FIG. 15 is substantially the same as the control routine illustrated in FIG. 11 in that 1) at or immediately after moment $t_1$, the controller 300 goes through boxes 701, 702, 703, 704, 705, and 706, 2) between moments $t_1$ and $t_2$, the controller 300 repeats flow along boxes 701, 711, 712, 703, 704, 705, and 706, 3) at moment $t_2$, the controller 300 goes through boxes 701, 711, 712, and 713, and 4) between moments $t_2$ and $t_3$, the controller 300 repeats flow along boxes 701, 711, 712, and 713. The control routine of FIG. 15 is different from the control routine of FIG. 11 in that 5) at or immediately after moment $t_3$, after the controller 300 has gone through boxes 701, 711, 712, 713, 714 and 715, the controller 300 goes through boxes 731, 732, 733, 734, 718 and 706 before returning to the main routine at box 601, 6) between moments $t_3$ and $t_4$, the controller 300 repeats flow along boxes 701, 711, 721, 733, 734, 718 and 706, and 7) at or immediately after moment $t_4$, the controller 300 goes through boxes 701, 711, 721, 722 and 723.

Figure 16:
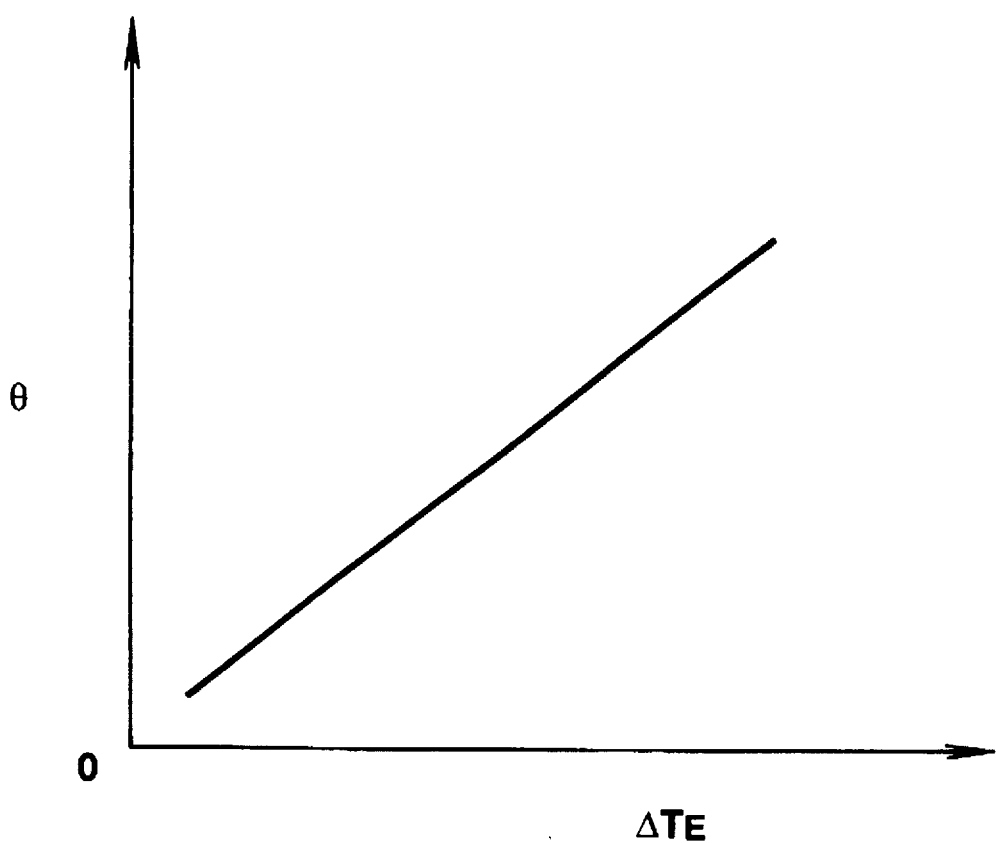
FIG. 16 shows a desired relationship between the rate of increase $\theta$ and deviation delta $T_E$.

Referring to FIGS. 14D, 15 and 16, at or immediately after moment $t_3$, the controller 300 determines, at box 731, an engine torque deviation delta $T_E$ by subtracting the engine torque $T_{E1}$ determined at moment $t_2$ from the engine torque $T_{E2}$ determined atmoment $t_3$. In the next box 732, the controller 300 performs table lock-up operation of FIG. 16 based on the determined deviation delta $T_E$ to determine a rate of increase θ. The controller 300, next, inputs information of content of timer T as Tn at box 733. The controller 300 determines a ramp lock-up control pressure $P_{LUR}$, which is expressed by the following equation.

$$P_{LUR} = P_{LU1} + \theta \times Tn$$

The controller 300 determines $DUTY_{128}$ with which the lock-up duty solenoid 128 can produce the determined ramp pressure $P_{LUR}$ at box 718. Between moments $t_3$ and $t_4$, this ramp pressure $P_{LUR}$ increases at the rate θ at box 734 since Tn increases at box 733. At or immediately after $t_4$, the controller 300 resets timer flag TIM at box 722 and resets lock-up slip control flag FL at box 723 before returning to the main routine at box 601.

Figure 14E:
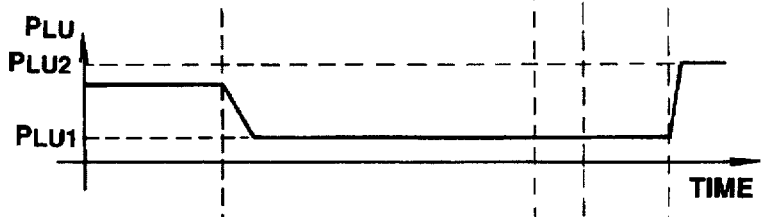
Figure 17:
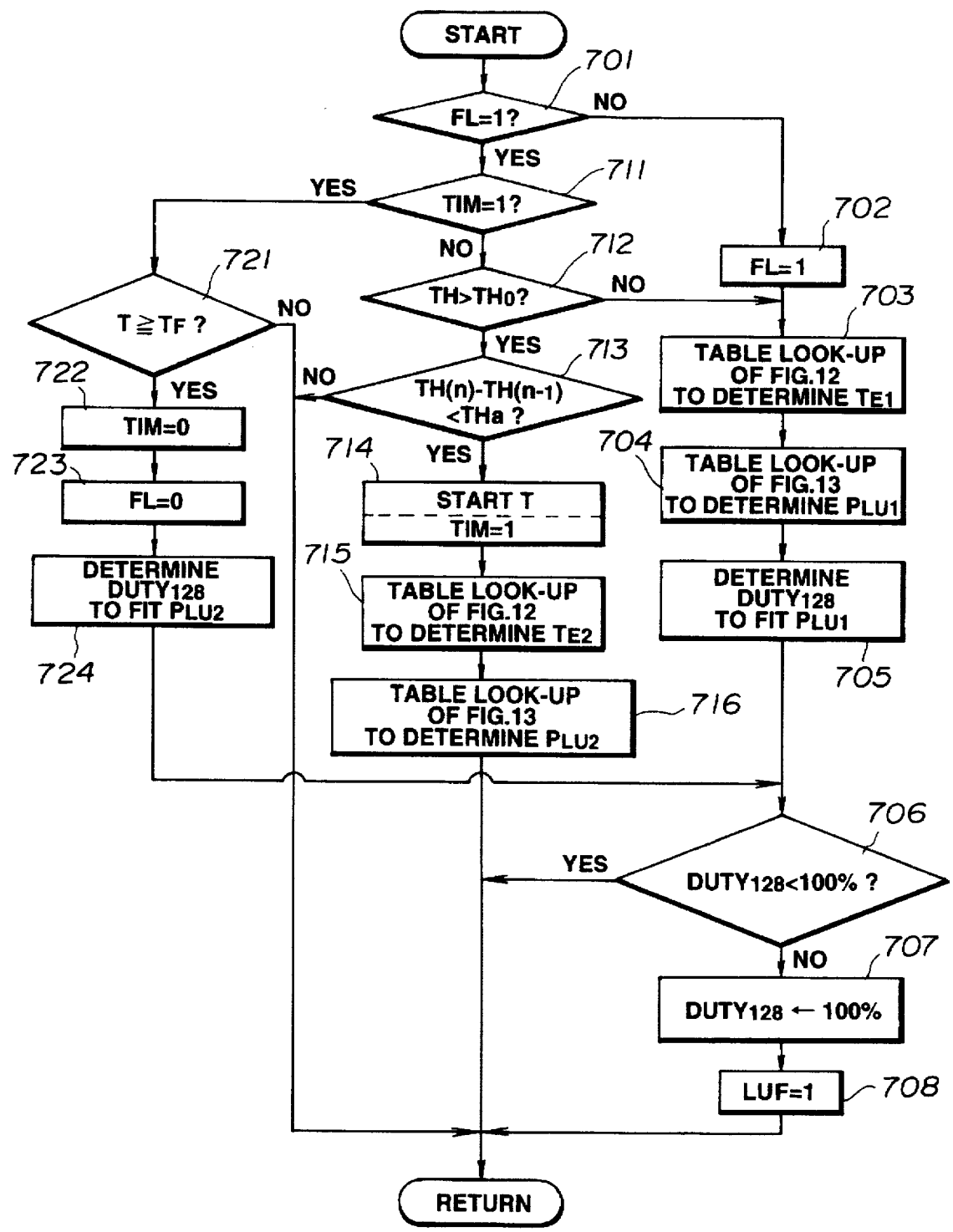
FIG. 17 is a flow diagram illustrating still another control routine of lock-up slip control.

The flow diagram of FIG. 17 illustrates a control routine of lock-up slip control that can control the lock-up control pressure $P_{LU}$ as shown in FIG. 14E. In FIG. 14E, the lock-up control pressure $P_{LU1}$ determined at moment $t_2$ is maintained between moments $t_2$ and $t_4$.

The control routine of FIG. 17 is substantially the same as the control routine of FIG. 11 except elimination of the boxes 717 and 718. In FIG. 17, the controller 300 goes through boxes 701, 711, 712, 713, 714, 715, and 716 before returning to the main routine at 601 at or immediately after moment $t_3$. Between moments $t_3$ and $t_4$, the controller 300 repeats a flow of boxes 701, 711 and 721. $DUTY_{128}$ with which the lock-up duty solenoid 128 can produce the lock-up control pressure $P_{LU1}$ is determined at or immediately after moment $t_2$ and maintained during the period of time $T_F$ (between moments $t_3$ and $t_4$).

Figure 14F:

FIG. 14F illustrates variation of output shaft torque $T_O$. It is seen that the torque $T_O$ increases to a new level during moments $t_3$ and $t_4$ without any appreciable overshoot. The dotted line curve shows variation of output shaft torque $T_O$ without the lock-up slip control discussed above. From this dotted line curve, it is noted that the output shaft torque $T_O$ overshoots before entering the new level.

From the preceding description, it is now appreciated that the controller 300 controls lock-up command signal $DUTY_{128}$ to control, via lock-up control pressure $P_{LU}$, torque transmitting capacity of the lock-up clutch 12d to keep hydraulic drive of the fluid coupling 12 operable until a predetermined period of time passes after the subsequent increase of operator's power demand. The hydraulic drive is operable to absorb shocks during transmission of torque between the engine 10 and the CVT 29 due to substantial increase in engine torque after the subsequent increase of operator's power demand. This results in smooth increase of output shaft torque without any overshoot.

After the predetermined period of time has passed from the subsequent increase of operator's power demand, the controller 300 develops the lock-up command signal $DUTY_{128}$ in response to vehicle speed indicative signal V indicative of speed of the output shaft of the CVT 29 for engaging the lock-up clutch 12d. This transient operation is carried out smoothly and quickly because torque transmitting capacity of the lock-up clutch has been appropriately controlled during the lock-up slip control.

What is claimed is:

1. A control system for a vehicle drivetrain, including an engine a CVT having an input shaft and an output shaft a hydrokinetic torque transmitting unit for hydraulically transmitting torque from the engine to the input shaft of the CVT, and frictional torque transmitting means for mechanically transmitting torque from the engine to the input shaft of the CVT, the control system comprising:

lock-up control means operable in response to a lock-up command signal for establishing engagement of the frictional torque transmitting means; and controller means for developing the lock-up command signal in response to a signal indicative of speed of the output shaft of the CVT for engaging the frictional torque transmitting means, wherein the controller means:

controls the lock-up command signal to reduce torque transmitting capacity of the frictional torque transmitting means in response to drop of power demand to keep the hydraulic drive of the hydrokinetic torque transmitting unit operable until a predetermined period of time passes after a subsequent increase of power demand, develops the lock-up command signal in response to the signal indicative of speed of the output shaft of the CVT after the predetermined period of time has passed, controls torque transmitting capacity of the frictional torque transmitting means in response to torque to be transmitted to the CVT after the drop of power demand, and during the predetermined period of time, increases torque transmitting capacity of the frictional torque transmitting means to a middle value between a first value determined in response to torque to be transmitted to the CVT before the subsequent increase of power demand and a second value determined in response to torque to be transmitted to the CVT after the subsequent increase of power demand.

2. A control system as claimed in claim 1, wherein the controller means holds torque transmitting capacity of the frictional torque transmitting means at the middle value until the predetermined period of time passes.

3. A control system for a vehicle drivetrain including an engine, a CVT having an input shaft and an output shaft, a hydrokinetic torque transmitting unit for hydraulically transmitting torque from the engine to the input shaft of the CVT, and frictional torque transmitting means for mechanically transmitting torque from the engine to the input shaft of the CVT, the control system comprising:

lock-up control means operable in response to a lock-up command signal for establishing engagement of the frictional torque transmitting means; and controller means for developing the lock-up command signal in response to a signal indicative of speed of the output shaft of the CVT for engaging the frictional torque transmitting means, wherein the controller means:

controls the lock-up command signal to reduce torque transmitting capacity of the frictional torque transmitting means in response to drop of power demand to keep the hydraulic drive of the hydrokinetic torque transmitting unit operable until a predetermined period of time passes after a subsequent increase of power demand, develops the lock-up command signal in response to the signal indicative of speed of the output shaft of the CVT after the predetermined period of time has passed, controls torque transmitting capacity of the frictional torque transmitting means in response to torque to be transmitted to the CVT after the drop of power demand, during the predetermined period of time, controls torque transmitting capacity of the frictional torque transmitting means at a predetermined rate and determines a torque deviation of torque to be transmitted to the CVT before the subsequent increase of power demand from torque to be transmitted after the subsequent increase of power demand, and determines the predetermined rate in response to the determined torque deviation.

4. A control system for a vehicle drivetrain, including an engine, a CVT having an input shaft and an output shaft, a hydrokinetic torque transmitting unit for hydraulically transmitting torque from the engine to the input shaft of the CVT, and frictional torque transmitting means for mechanically transmitting torque from the engine to the input shaft of the CVT, the control system comprising:

lock-up control means operable in response to a lock-up command signal for establishing engagement of the frictional torque transmitting means; and controller means for developing the lock-up command signal in response to a signal indicative of speed of the output shaft of the CVT for engaging the frictional torque transmitting means, wherein the controller means:

controls the lock-up command signal to reduce torque transmitting capacity of the frictional torque transmitting means in response to drop of power demand to keep the hydraulic drive of the hydrokinetic torque transmitting unit operable until a predetermined period of time passes after a subsequent increase of power demand, increases torque transmitting capacity of the frictional torque transmitting means after the predetermined period of time has passed, and during the predetermined period of time, holds torque transmitting capacity of the frictional torque transmitting means at a value determined in response to torque to be transmitted to the CVT immediately before the subsequent increase of power demand.

5. A control system for a vehicle drivetrain, including an engine having a throttle that opens in response to power demand, an opening degree of the throttle being detected by a throttle position sensor, which generates a throttle opening degree indicative signal indicative of the detected opening degree, a CVT having an input shaft and an output shaft a hydrokinetic torque transmitting unit for hydraulically transmitting torque from the engine to the input shaft of the CVT, and frictional torque transmitting means for mechanically transmitting torque from the engine to the input shaft of the CVT, the control system comprising:

lock-up control means operable in response to a lock-up command signal for establishing engagement of the frictional torque transmitting means; and controller means for developing the lock-up command signal in response to a signal indicative of speed of the output shaft of the CVT for engaging the frictional torque transmitting means, wherein the controller means:

controls the lock-up command signal to reduce torque transmitting capacity of the frictional torque transmitting means in response to drop of power demand to keep the hydraulic drive of the hydrokinetic torque transmitting unit operable until a predetermined period of time passes after a subsequent increase of power demand, develops the lock-up command signal in response to the signal indicative of speed of the output shaft of the CVT after the predetermined period of time has passed, has a ratio control element positionable in response to a ratio command signal to establish various speed ratios between the input and output shafts of the CVT, develops the ratio command signal in response to power demand, inputs information of the throttle opening degree indicative signal as power demand, and compares the input information of the throttle opening degree indicative signal with a predetermined critical throttle opening degree of idle operation unless a lock-up slip control flag is set, controls the lock-up command signal to control torque transmitting capacity of the frictional torque transmitting means in response to the comparison, and sets the lock-up slip control flag.

6. A control system for a vehicle drivetrain, including an engine having a throttle that opens in response to power demand, an opening degree of the throttle being detected by a throttle position sensor, which generates a throttle opening degree indicative signal indicative of the detected opening degree, a CVT having an input shaft and an output shaft, a hydrokinetic torque transmitting unit for hydraulically transmitting torque from the engine to the input shaft of the CVT, and frictional torque transmitting means for mechanically transmitting torque from the engine to the input shaft of the CVT, the control system comprising:

lock-up control means operable in response to a lock-up command signal for establishing engagement of the frictional torque transmitting means; and controller means for developing the lock-up command signal in response to a signal indicative of speed of the output shaft of the CVT for engaging the frictional torque transmitting means, wherein the controller means:

controls the lock-up command signal to reduce torque transmitting capacity of the frictional torque transmitting means in response to drop of power demand to keep the hydraulic drive of the hydrokinetic torque transmitting unit operable until a predetermined period of time passes after a subsequent increase of power demand, develops the lock-up command signal in response to the signal indicative of speed of the output shaft of the CVT after the predetermined period of time has passed, has a ratio control element positionable in response to a ratio command signal to establish various speed ratios between the input and output shafts of the CVT, develops the ratio command signal in response to power demand, inputs information of the throttle opening degree indicative signal as power demand, and compares the input information of the throttle opening degree indicative signal with a predetermined critical throttle opening degree of idle operation unless a lock-up slip control flag is set, inputs information of speed of the engine, determines torque to be transmitted to the CVT as a function of the input information of engine speed and the input information of throttle opening degree indicative signal, determines torque transmitting capacity of the frictional torque transmitting means as a function of the determined torque, controls, in response to the comparison, the lock-up command signal to attain the determined torque transmitting capacity, and sets the lock-up slip control flag.

7. A control system as claimed in claim 6, wherein after the lock-up slip control flag has been set, the controller means repeats inputting information of the throttle opening degree indicative signal, comparing the input information of the throttle opening degree indicative signal with the predetermined critical throttle opening degree of idle operation, and determining a rate of change in the input information of the throttle opening degree indicative signal, and comparing the determined rate of change with a predetermined value.

8. A control system as claimed in claim 7, wherein after the lock-up slip control flag has been set, the controller means starts a timer at first moment when the controller means determines that the determined rate change in the input information of the throttle opening degree indicative signal is less than the predetermined value after the controller means has determined that the input information of the throttle opening degree indicative signal is greater than the predetermined critical throttle opening degree of idle operation, and the controller means increases torque transmitting capacity of the frictional torque transmitting means at second moment when the controller means determines that the timer has counted the predetermined period of time and clears the lock-up slip control flag.

9. A control system as claimed in claim 8, wherein after the lock-up slip control flag has been set, the controller means maintains the determined torque transmitting capacity immediately before the subsequent increase of power demand.

10. A control system as claimed in claim 8, wherein the controller means determines first torque to be transmitted to the CVT immediately before the subsequent increase of power demand as function of input information of engine speed and input information of throttle opening degree indicative signal, determines second torque to be transmitted to the CVT immediately after the subsequent increase of power demand as function of input information of engine speed and input information of throttle opening degree indicative signal, determines first and second torque transmitting capacity of the frictional torque transmitting means as function of the determined first and second torque, respectively, and determines a middle value between the determined first torque transmitting capacity and the determined second torque transmitting capacity.

11. A control system as claimed in claim 10, wherein the controller means holds torque transmitting capacity of the frictional torque transmitting means at the determined middle value during the predetermined period of time.

12. A control system as claimed in claim 9, wherein the controller means determines first torque to be transmitted to the CVT immediately before the subsequent increase of power demand as function of input information of engine speed and input information of throttle opening degree indicative signal, determines second torque to be transmitted to the CVT immediately after the subsequent increase of power demand as function of input information of engine speed and input information of throttle opening degree indicative signal, determines a torque deviation of the determined first torque from the determined second torque, determines a rate of increase as function of the determined torque deviation.

13. A control system as claimed in claim 12, wherein the controller means increases torque transmitting capacity of the frictional torque transmitting means at the determined rate of increase immediately after the subsequent increase of power demand.

14. A control system as claimed in claim 8, wherein the controller means holds torque transmitting capacity of the frictional torque transmitting means at torque transmitting capacity, which has been determined immediately before the subsequent increase of power demand until the predetermined period of time passes after the subsequent increase of power demand.

* * * * *